United States Patent
Vikberg et al.

(10) Patent No.: US 11,394,483 B2
(45) Date of Patent: *Jul. 19, 2022

(54) UPLINK SIGNALING FOR DUAL CONNECTIVITY

(71) Applicant: Telefonaktiebolaget LM Ericsson (publ), Stockholm (SE)

(72) Inventors: Jari Vikberg, Järna (SE); Gunnar Mildh, Sollentuna (SE); Johan Rune, Lidingö (SE); Icaro Leonardo J. Da Silva, Solna (SE); Pontus Wallentin, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 51 days.

This patent is subject to a terminal disclaimer.

(21) Appl. No.: 16/843,363

(22) Filed: Apr. 8, 2020

(65) Prior Publication Data
US 2020/0235845 A1     Jul. 23, 2020

Related U.S. Application Data

(63) Continuation of application No. 16/288,474, filed on Feb. 28, 2019, now Pat. No. 10,651,964, which is a
(Continued)

(51) Int. Cl.
*H04W 72/08* (2009.01)
*H04L 1/00* (2006.01)
(Continued)

(52) U.S. Cl.
CPC .............. *H04L 1/0001* (2013.01); *H04L 1/00* (2013.01); *H04W 28/0231* (2013.01); *H04W 72/08* (2013.01); *H04W 76/00* (2013.01)

(58) Field of Classification Search
CPC ..... H04W 28/00; H04W 72/00; H04W 76/00; H04L 1/00
See application file for complete search history.

(56) References Cited

U.S. PATENT DOCUMENTS

| 10,263,729 B2 | 4/2019 | Vikberg et al. |
| 2014/0092785 A1 | 4/2014 | Song et al. |

(Continued)

FOREIGN PATENT DOCUMENTS

| CN | 102088662 A | 6/2011 |
| WO | 2007047297 A2 | 4/2007 |

(Continued)

OTHER PUBLICATIONS

Dryjanski, M., "NR, gNB, NG-Ran and 5GC—Why 5G is complex?" LinkedIn, retrieved Nov. 15, 2019 from https://www.linkedin.com/pulse/nr-gnb-ng-ran-5gc-why-5g-complex-marcin-dryjanski/, 3 pages.

(Continued)

*Primary Examiner* — Kent Krueger
(74) *Attorney, Agent, or Firm* — Withrow & Terranova, PLLC

(57) ABSTRACT

The disclosure relates to a method in a wireless device for transmitting an uplink signalling message in a wireless communication network. The wireless device is connected to a first network element over at least a first and a second wireless link. The method comprises determining a transmission mode among alternative transmission modes for transmitting the uplink signalling message. The alternative transmission modes comprise: transmitting on the first wireless link; transmitting on the second wireless link; and transmitting on both the first and the second wireless links. The method also comprises transmitting the uplink signalling message according to the determined transmission mode. The disclosure also relates to a corresponding method (Continued)

Receive information from the wireless communication network, indicating at least one of the alternative transmission modes — 1800

Determine a transmission mode based on the received information — 1810

1820 performed in the network element, and to the corresponding apparatus.

11 Claims, 18 Drawing Sheets

Related U.S. Application Data continuation of application No. 14/890,452, filed as application No. PCT/SE2015/050900 on Aug. 26, 2015, now Pat. No. 10,263,729.

(51) Int. Cl.
*H04W 28/02* (2009.01)
*H04W 76/00* (2018.01)

(56) References Cited

U.S. PATENT DOCUMENTS

| | | | |
|---|---|---|---|
| 2014/0369242 A1 | 12/2014 | Ng et al. | |
| 2015/0043479 A1 | 2/2015 | Kitazoe et al. | |
| 2015/0319718 A1 | 11/2015 | Yang et al. | |
| 2015/0358866 A1 | 12/2015 | Xu et al. | |
| 2017/0257183 A1 | 9/2017 | Vikberg et al. | |
| 2019/0199466 A1 | 6/2019 | Vikberg et al. | |

FOREIGN PATENT DOCUMENTS

| | | |
|---|---|---|
| WO | 2014127054 A1 | 8/2014 |
| WO | 2015021318 A2 | 2/2015 |
| WO | 2015062085 A1 | 5/2015 |
| WO | 2016099369 A1 | 6/2016 |
| WO | 2016130061 A1 | 8/2016 |

OTHER PUBLICATIONS

Fujitsu, "R1-140192: Physical layer issues of dual connectivity," 3GPP TSG RAN WG1 Meeting #76, Feb. 10-14, 2014, Prague, Czech Republic, 9 pages.
Huawei, et al., "RI-150067: Support of PUCCH on SCell based on dual connectivity mechanism," 3rd Generation Partnership Project (3GPP), TSG RAN WG1 Meeting #80, Feb. 9-13, 2015, 4 pages, Athens, Greece.
Kavanagh, S., "What is 5G New Radio (5G NR)," 2019, 5G.co.uk, retrieved Nov. 15, 2019 from https://5g.co.uk/guides/what-is-5g-new-radio/, 6 pages.
Non-Final Office Action for U.S. Appl. No. 14/890,452, dated Sep. 12, 2017, 13 pages.
Final Office Action for U.S. Appl. No. 14/890,452, dated Apr. 13, 2018, 16 pages.
Non-Final Office Action for U.S. Appl. No. 14/890,452, dated Jun. 28, 2018, 16 pages.
Notice of Allowance for U.S. Appl. No. 14/890,452, dated Nov. 29, 2018, 8 pages.
Moticeof Allowability and Examiner-Initiated Interview Summary for U.S. Appl. No. 14/890,452, dated Dec. 26, 2018, 7 pages.
Corrected Notice of Allowability for U.S. Appl. No. 14/890,452, dated Mar. 1, 2019, 7 pages.
Non-Final Office Action for U.S. Appl. No. 16/288,474, dated Aug. 21, 2019, 12 pages.
Notice of Allowance and Examiner-Initiated Interview Summary for U.S. Appl. No. 16/288,474, dated Jan. 9, 2020, 8 pages.
Expert Report for Chilean Patent Application No. 2017-003495, dated Feb. 14, 2019, 21 pages.
Extended European Search Report for European Patent Application No. 18189986.5, dated Nov. 26, 2018, 6 pages.
Extended European Search Report for European Patent Application No. 19202149.1, dated Nov. 28, 2019, 4 pages.
Examination Report for Indian Patent Application No. 201747032003, dated Oct. 15, 2019, 7 pages.
Office Action for Japanese Patent Application No. 2018-521173, dated Dec. 14, 2018, 6 pages.
Decision to Grant for Japanese Patent Application No. 2018-521173, dated Nov. 29, 2019, 5 pages.
Notice of Preliminary Rejection for Korean Patent Application No. 10-2017-7036085, dated Aug. 21, 2019, 13 pages.
Decision to Grant for Korean Patent Application No. 10-2017-7036085, dated Feb. 7, 2020, 4 pages.
Official Action and Search Report for Russian Patent Application No. 2018106650, dated Jan. 14, 2019, 20 pages.
Decision to Grant for Russian Patent Application No. 2018106650, 8 pages.
International Search Report and Written Opinion for International Patent Application No. PCT/SE2015/050900, dated Dec. 18, 2015, 12 pages.
International Preliminary Report on Patentability for International Patent Application No. PCT/SE2015/050900, dated Jul. 25, 2017, 7 pages.
Office Action for Chinese Patent Application No. 201580082087.4, dated Mar. 10, 2020, 8 pages.

Determine at least one transmission mode among alternative transmission modes for transmitting the uplink signalling message, based on criteria for selecting transmission mode — 1910

Transmit information comprising an indication of the determined at least one transmission mode to the wireless device, to enable the wireless device to determine transmission mode — 1920

Fig. 19

UPLINK SIGNALING FOR DUAL CONNECTIVITY

This application is a continuation of U.S. application Ser. No. 16/288,474, filed Feb. 28, 2019, now U.S. Pat. No. 10,651,964, which is a continuation of U.S. application Ser. No. 14/890,452, filed Nov. 11, 2015, now U.S. Pat. No. 10,263,729, which is a 35 U.S.C. § 371 national phase filing of International Application No. PCT/SE2015/050900, filed Aug. 26, 2015, the disclosures of which are incorporated herein by reference in their entireties.

TECHNICAL FIELD

The disclosure generally relates to dual connectivity, and particularly relates to methods and apparatus for enabling a wireless device to transmit an uplink signaling message when the wireless device is connected to a first network element over at least two wireless links.

BACKGROUND

Evolved Packet System (EPS) is the evolved $3^{rd}$ Generation Partnership Project (3GPP) Packet Switched Domain. EPS includes Evolved Packet Core (EPC), and Evolved Universal Terrestrial Radio Access Network (E-UTRAN). FIG. 1 shows an overview of the EPC architecture in a non-roaming context, which architecture includes a Packet Data Network (PDN) Gateway (PGW), a Serving Gateway (SGW), a Policy and Charging Rules Function (PCRF), a Mobility Management Entity (MME) and a wireless device also called a User Equipment (UE). The radio access network, E-UTRAN, consists of one or more eNodeBs (eNB).

FIG. 2 shows the overall E-UTRAN architecture and includes eNBs, providing the E-UTRA user plane and control plane protocol terminations towards the UE. The user plane control terminations comprise Packet Data Convergence Protocol (PDCP), Radio Link Control (RLC), Medium Access Control (MAC), and a Physical Layer (PHY). The control plane control terminations comprise Radio Resource Control (RRC) in addition to the listed user plane control terminations. The eNBs are interconnected with each other by means of an X2 interface. The eNBs are also connected by means of the S1 interface to the EPC, more specifically to the MME by means of the S1-MME interface and to the SGW by means of the S1-U interface. The main parts of the EPC Control Plane and User Plane architectures are shown in FIG. 3 and FIG. 4, respectively.

Long Term Evolution (LTE) Overview

LTE uses Orthogonal Frequency Division Multiplexing (OFDM) in the Downlink (DL) and Direct Fourier Transform (DFT)-spread OFDM in the Uplink (UL). The basic LTE DL physical resource can thus be seen as a time-frequency grid as illustrated in FIG. 5, where each resource element corresponds to one OFDM subcarrier during one OFDM symbol interval.

In the time domain, LTE DL transmissions are organized into radio frames of 10 ms, each radio frame consisting of ten equally-sized subframes of length $T_{frame}=1$ ms (see FIG. 6). Furthermore, the resource allocation in LTE is typically described in terms of resource blocks (RB), where a RB corresponds to one slot (0.5 ms) in the time domain and 12 contiguous subcarriers in the frequency domain. A pair of two adjacent RBs in time direction (1.0 ms) is known as a RB pair. RBs are numbered in the frequency domain, starting with 0 from one end of the system bandwidth. The notion of virtual RBs (VRB) and physical RBs (PRB), has been introduced in LTE. The actual resource allocation to a UE is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain; thereby providing frequency diversity for data channel transmitted using these distributed VRBs.

DL transmissions are dynamically scheduled, i.e., in each subframe the base station transmits control information about to which terminals data is transmitted and upon which RBs the data is transmitted in the current DL subframe. This control signaling is typically transmitted in the first 1, 2, 3 or 4 OFDM symbols in each subframe and the number n=1, 2, 3 or 4 is known as the Control Format Indicator (CFI). The DL subframe also contains Common Reference Symbols (CRS) which are known to the receiver and used for coherent demodulation of, e.g., the control information. A DL system with CFI=3 is illustrated in FIG. 7.

LTE Control and User Plane Architecture

Conventional control and user plane protocol architectures highlighting the radio interface on the eNB-side are shown in FIGS. 8a and 8b. The control and user plane consist of the following protocol layers and main functionality:

Radio Resource Control, RRC (control plane only)
    Broadcast of system information for both Non-access stratum (NAS) and Access stratum (AS)
    Paging
    RRC connection handling
    Allocation of temporary identifiers for the UE
    Configuration of signaling radio bearer(s) for RRC connection
    Handling of radio bearers
    QoS management functions
    Security functions including key management
    Mobility functions including:
        UE measurement reporting and control of the reporting
        Handover
        UE cell selection and reselection and control of cell selection and reselection
    NAS direct message transfer to/from the UE Packet Data Convergence Protocol, PDCP
    There exists one PDCP entity for each radio bearer for the UE. PDCP is used for both control plane (RRC) and for user plane
    Control plane main functions, including ciphering/deciphering and integrity protection
    User Plane main functions, including ciphering/deciphering, header compression and decompression using Robust Header Compression (ROHC), and in-sequence delivery, duplicate detection and retransmission (mainly used during handover)

Radio Link Control, RLC
    The RLC layer provides services for the PDCP layer and there exists one RLC entity for each radio bearer for the UE
    Main functions for both control and user plane include segmentation or concatenation, retransmission handling (using Automatic Repeat Request (ARQ), duplicate detection and in-sequence delivery to higher layers.

Medium Access Control, MAC

The MAC provides services to the RLC layer in the form of logical channels, and performs mapping between these logical channels and transport channels Main functions are: UL and DL scheduling, scheduling information reporting, hybrid-ARQ retransmissions and multiplexing/demultiplexing data across multiple component carriers for carrier aggregation Physical Layer, PHY The PHY provides services to the MAC layer in the form of transport channels and handles mapping of transport channels to physical channels.

Main functions for DL performed by the eNB (OFDM) are:

Sending of DL reference signals

Detailed steps (from "top to down"): Cyclic Redundancy Check (CRC) insertion; code block segmentation and per-code-block CRC insertion; channel coding (Turbo coding); rate matching and physical-layer hybrid-ARQ processing; bit-level scrambling; data modulation (Quadrature Phase Shift Keying (QPSK), 16 Quadrature Amplitude Modulation (QAM), or 64QAM); antenna mapping and multi-antenna processing; OFDM processing, including Inverse Fast Fourier Transform (IFFT), and Cyclic Prefix (CP) insertion resulting in time domain data sometimes referred to as IQ data or digitalized Radio Frequency (RF) data); digital-to-analog conversion; power amplifier; and sending to antenna.

Main functions for UL performed by the eNB (DFT-spread OFDM) are:

Random access support

Detailed steps (from "top to down"): CRC removal, code block de-segmentation, channel decoding, rate matching and physical-layer hybrid-ARQ processing; bit-level descrambling; data demodulation; Inverse Discrete Fourier Transform (IDFT); antenna mapping and multi-antenna processing; OFDM processing, including Fast Fourier Transform (FFT) and CP removal; Analog-to-Digital conversion; power amplifier; and receiving from antenna.

The described eNB functionality can be deployed in different ways. In one example, all the protocol layers and related functionality are deployed in the same physical node, including the antenna. One example of this is a pico or femto eNodeB. Another deployment example is a so called Main-Remote split. In this case, the eNodeB is divided into a Main Unit and a Remote Unit that are also called Digital Unit (DU) and Remote Radio Unit (RRU) respectively. The Main Unit or DU contains all the protocol layers, except the lower parts of the PHY layer that are instead placed in the Remote Unit or RRU. The split in the PHY-layer is at the time domain data level (IQ data, i.e. after/before IFFT/FFT and CP insertion/removal). The IQ data is forwarded from the Main Unit to the Remote Unit over a so called Common Public Radio Interface (CPRI) which is a high speed, low latency data interface. The Remote Unit then performs the needed Digital-to-Analog conversion to create analog RF-data, power amplifies the analog RF-data and forwards the analog RF data to the antenna. In still another deployment option, the RRU and the antenna are co-located, creating a so called Antenna Integrated Radio (AIR).

Carrier Aggregation

The LTE Rel-10 specifications have been standardized, supporting Component Carrier (CC) bandwidths up to 20 MHz, which is the maximal LTE Rel-8 carrier bandwidth. An LTE Rel-10 operation wider than 20 MHz is possible and appears as a number of LTE CCs to an LTE Rel-10 terminal. The straightforward way to obtain bandwidths wider than 20 MHz is by means of Carrier Aggregation (CA). CA implies that an LTE Rel-10 terminal can receive multiple CCs, where the CCs have or at least have the possibility to have, the same structure as a Rel-8 carrier. CA is illustrated in FIG. 9. The Rel-10 standard support up to five aggregated CCs, where each CC is limited in the RF specifications to have one of six bandwidths, namely 6, 15, 25, 50, 75 or 100 RB corresponding to 1.4, 3, 5, 10, 15, and 20 MHz respectively. The number of aggregated CCs as well as the bandwidth of the individual CCs may be different for UL and DL. A symmetric configuration refers to the case where the number of CCs in DL and UL is the same whereas an asymmetric configuration refers to the case that the number of CCs is different in DL and UL. It is important to note that the number of CCs configured in the network may be different from the number of CCs seen by a terminal. A terminal may for example support more DL CCs than UL CCs, even though the network offers the same number of UL and DL CCs.

CCs are also referred to as cells or serving cells. More specifically, in an LTE network, the cells aggregated by a terminal are denoted primary Serving Cell (PCell), and secondary Serving Cell (SCell). The term serving cell comprises both PCell and one or more SCells. All UEs have one PCell. Which cell that is a UE's PCell is terminal specific. This PCell is considered "more important", i.e., vital control signaling and other important signaling is typically handled via the PCell. UL control signaling is always sent on a UE's PCell. The component carrier configured as the PCell is the primary CC whereas all other CCs are SCells. The UE can send and receive data both on the PCell and SCells. Control signaling, such as scheduling commands, may be configured to be transmitted and received only on the PCell. However, the commands are also valid for SCell, and the commands may also be configured to be transmitted and received on both PCell and SCells. Regardless of the mode of operation, the UE will only need to read the broadcast channel in order to acquire system information parameters on the Primary Component Carrier (PCC). System information related to the Secondary Component Carrier(s) (SCC), may be provided to the UE in dedicated RRC messages. During initial access, an LTE Rel-10 terminal behaves similar to a LTE Rel-8 terminal. However, upon successful connection to the network, a Rel-10 terminal may—depending on its own capabilities and the network—be configured with additional serving cells in the UL and DL. Configuration is based on RRC. Due to the heavy signaling and rather slow speed of RRC signaling, it is envisioned that a terminal may be configured with multiple serving cells even though not all of them are currently used. In summary, LTE CA supports efficient use of multiple carriers, allowing data to be sent and received over all carriers. Cross-carrier scheduling is supported, avoiding the need for the UE to listen to all carrier-scheduling channels all the time. A solution relies on tight time synchronization between the carriers.

LTE Rel-12 Dual Connectivity

Dual connectivity (DC) is a solution currently being standardized by 3GPP to support UEs connecting to multiple carriers to send and receive data on multiple carriers at the same time. The following is an overview description of DC based on the current 3GPP standard. E-UTRAN supports DC operation, whereby a UE with multiple receivers and transmitters, which is in RRC_CONNECTED mode, is configured to utilize radio resources provided by two distinct schedulers, located in two eNBs interconnected via a non-ideal backhaul over the X2. eNBs involved in DC for a certain UE may assume two different roles. An eNB may either act as a Master eNB (MeNB), or as a Secondary eNB (SeNB). In DC, a UE is connected to one MeNB and one SeNB. The radio protocol architecture that a particular bearer uses depends on how the bearer is setup. Three alternatives exist: Master Cell Group (MCG) bearer, Secondary Cell Group (SCG) bearer, and split bearer. Those three alternatives are depicted in FIG. 10. Signal Radio Bearers (SRBs) are always associated with the MCG bearer and therefore only use the radio resources provided by the MeNB. Note that DC can also be described as having at least one bearer configured to use radio resources provided by the SeNB.

Inter-eNB control plane signaling for DC is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in DC for a certain UE owns its radio resources and is primarily responsible for allocating radio resources of its cells. Coordination between MeNB and SeNB is performed by means of X2 interface signaling. FIG. 11 shows Control Plane (C-plane) connectivity of eNBs involved in DC for a certain UE. The MeNB is C-plane connected to the MME via S1-MME, the MeNB and the SeNB are interconnected via X2-C. FIG. 12 shows User Plane (U-plane) connectivity of eNBs involved in DC for a certain UE. U-plane connectivity depends on the bearer option configured. For MCG bearers, the MeNB is U-plane connected to the S-GW via S1-U, and the SeNB is not involved in the transport of user plane data. For split bearers, the MeNB is U-plane connected to the S-GW via S1-U and in addition, the MeNB and the SeNB are interconnected via X2-U. For SCG bearers, the SeNB is directly connected with the S-GW via S1-U.

Centralization of Radio Access Network (E-UTRAN) Functionality

Possible future evolution of the current Radio Access Network (RAN) architecture has been discussed. From a starting point in a macro site based topology, introduction of low power cells, an evolution of the transport network between different radio base station sites, a radio base station hardware evolution, and an increased need for processing power to give some examples, have given rise to new challenges and opportunities. Several strategies are proposed for the RAN architecture, pulling in sometimes different directions. Some strategies, like the gains of coordination, hardware pooling gains, energy saving gains and the evolution of the backhaul/fronthaul network, are working in favor of a more centralized deployment. At the same time, other strategies are working towards de-centralization, such as very low latency requirements for some 5G use cases, e.g., mission critical Machine Type Communication (MTC) applications. The terms fronthaul and backhaul are used in relation to the base station. The traditional definition for fronthaul is the CPRI based fiber link between the baseband Main Unit and the Remote Unit. The backhaul refers to the transport network used for S1/X2-interfaces.

The recent evolution in backhaul/fronthaul technologies has indeed opened up the possibility to centralize the baseband, often referred to as C-RAN. C-RAN is a term that can be interpreted in different ways. For some it means a "baseband hotel" like solutions in which the basebands from many sites are collocated to a central site, although there is no tight connection and fast exchange of data between the baseband units. The most common interpretation of C-RAN is maybe "Centralized RAN" where there is at least some kind of coordination between the basebands. A potentially attractive solution is the smaller centralized RAN that is based on a macro base station and the lower power nodes covered by it. In such a configuration, a tight coordination between the macro and the low power nodes can often give considerable gains. The term "Coordinated RAN" is an often used interpretation of C-RAN that focuses on the coordination gains of the centralization. Other more futuristic interpretations of C-RAN include "cloud" based and "virtualized" RAN solutions where the radio network functionality is supported on generic hardware such as general purpose processors, and possibly as virtual machines.

A centralized deployment can be driven by one or several forces like, e.g., a possible ease of maintenance, upgrade and less need for sites, as well as harvesting of coordination gains. A common misconception is that there is a large pooling gain and a corresponding hardware saving to be done by the centralization. The pooling gain is large over the first number of pooled cells but then diminishes quickly. One key advantage of having the basebands from a larger number of sites co-located and interconnected is the tight coordination that it allows. Examples of these are UL Coordinated Multi-Point (CoMP), and a combining of several sectors and/or carriers into one cell. The gains of these features can sometimes be significant in relation to the gains of looser coordination schemes such as, e.g., enhanced inter-cell interference coordination (eICIC) that can be done over standard interfaces (X2) without co-location of the baseband.

An attractive C-RAN deployment from a coordination gain perspective is the C-RAN built around a larger macro site, normally with several frequency bands, and a number of lower power radios, covered by the macro site, that are tightly integrated into the macro over high-speed interconnect. The largest gains are expected to be seen in deployment scenarios such as for stadiums and malls. An important consideration for any C-RAN deployment is the transport over the fronthaul, i.e., the connection between the centralized baseband part and the radios, sometimes referred to as "the first mile". The cost of the fronthaul, which vary rather greatly between markets, needs to be balanced against the benefits.

SUMMARY

For a UE connected to the DC RAN architecture with a radio protocol architecture as illustrated in FIG. 10 and further described in the background section, there is no known procedure for how to transmit uplink signaling messages to the network. If a wireless device is connected to the network over two or more wireless links, the wireless device needs to know for example on which link to transmit the uplink signaling message.

An object is to alleviate or at least reduce one or more of the above mentioned problems, and to provide a procedure for transmitting uplinks signaling messages in a multi-connectivity scenario. This object and others are achieved by methods, a wireless device, and a network element according to the independent claims, and by the embodiments according to the dependent claims.

According to a first aspect, a method for transmitting an uplink signaling message in a wireless communication network is provided. The method is performed in a wireless device. The wireless device is connected to a first network element over at least a first and a second wireless link. The method comprises determining a transmission mode among alternative transmission modes for transmitting the uplink signaling message. The alternative transmission modes comprise: transmitting on the first wireless link; transmitting on the second wireless link; and transmitting on both the first and the second wireless links. The method also comprises transmitting the uplink signaling message according to the determined transmission mode.

According to a second aspect, a method for enabling a wireless device to transmit an uplink signaling message in a wireless communication network is provided. The method is performed in a first network element. The wireless device is connected to the first network element over at least a first and a second wireless link. The method is performed in the first network element. The method comprises determining at least one transmission mode among alternative transmission modes for transmitting the uplink signaling message. The alternative transmission modes comprise: transmitting on the first wireless link; transmitting on the second wireless link; and transmitting on both the first and the second wireless links. The determining is based on criteria for determining transmission mode. The method also comprises transmitting information to the wireless device enabling the wireless device to determine transmission mode for transmitting the uplink signaling message. The information comprises an indication of the determined at least one transmission mode.

According to a third aspect, a wireless device configured to transmit an uplink signaling message in a wireless communication network is provided. The wireless device is connectable to a first network element over at least a first and a second wireless link. The wireless device is further configured to determine a transmission mode among alternative transmission modes for transmitting the uplink signaling message. The alternative transmission modes comprise: transmitting on the first wireless link; transmitting on the second wireless link; and transmitting on both the first and the second wireless links. The wireless device is also configured to transmit the uplink signaling message according to the determined transmission mode.

According to a fourth aspect, a first network element configured to enable a wireless device to transmit an uplink signaling message in a wireless communication network is provided. The wireless device is connectable to the first network element over at least a first and a second wireless link. The first network element is further configured to determine at least one transmission mode among alternative transmission modes for transmitting the uplink signaling message. The alternative transmission modes comprise: transmitting on the first wireless link; transmitting on the second wireless link; and transmitting on both the first and the second wireless links. The determining is based on criteria for determining transmission mode. The first network element is also configured to transmit information to the wireless device enabling the wireless device to determine transmission mode for transmitting the uplink signaling message, the information comprising an indication of the determined at least one transmission mode.

According to further aspects, computer programs and computer program products corresponding to the aspects above are provided.

One advantage of embodiments is that a procedure for how a wireless device transmits uplink signaling messages in a multi-connectivity scenario is provided. Another advantage is that a transmission mode for transmitting the uplink signaling message may be adapted to a current situation such as e.g. a capability of the wireless device or a load situation.

Other objects, advantages and features of embodiments will be explained in the following detailed description when considered in conjunction with the accompanying drawings and claims.

BRIEF DESCRIPTION OF THE DRAWINGS

The various aspects of embodiments disclosed herein, including particular features and advantages thereof, will be readily understood from the following detailed description and the accompanying drawings.

FIG. 19 is a flow chart schematically illustrating embodiments of a method for a network element according to various embodiments.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Figure 1:
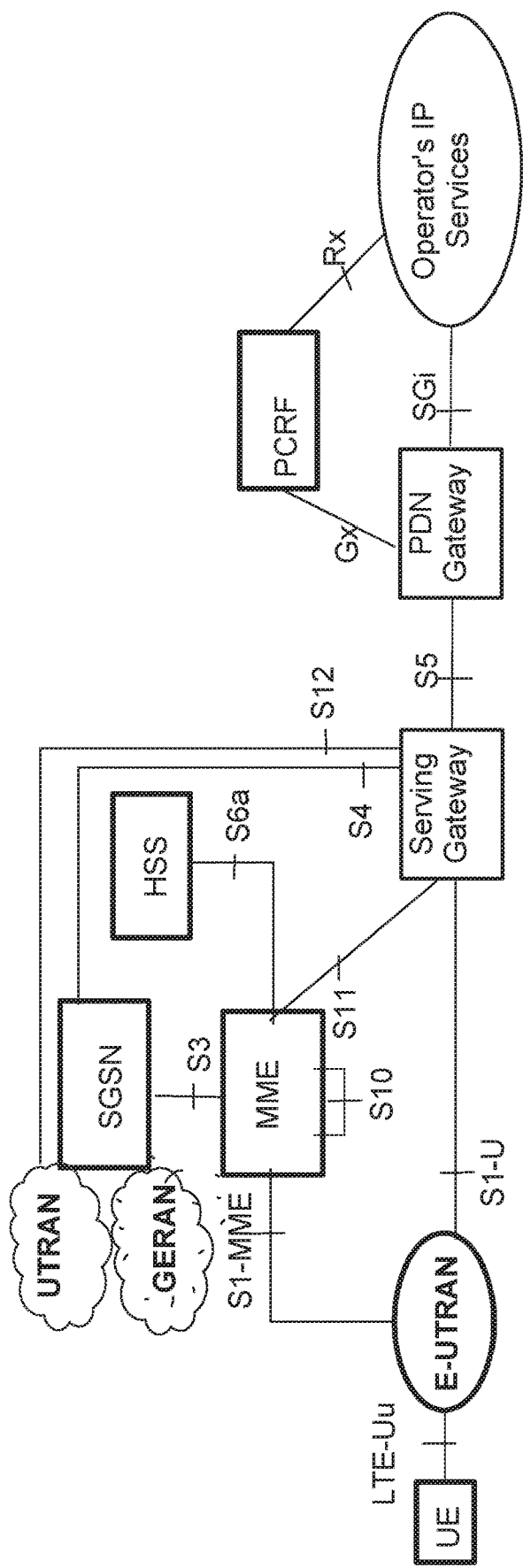
FIG. 1 is a block diagram schematically illustrating a non-roaming EPC architecture for 3GPP accesses.
Figure 2:
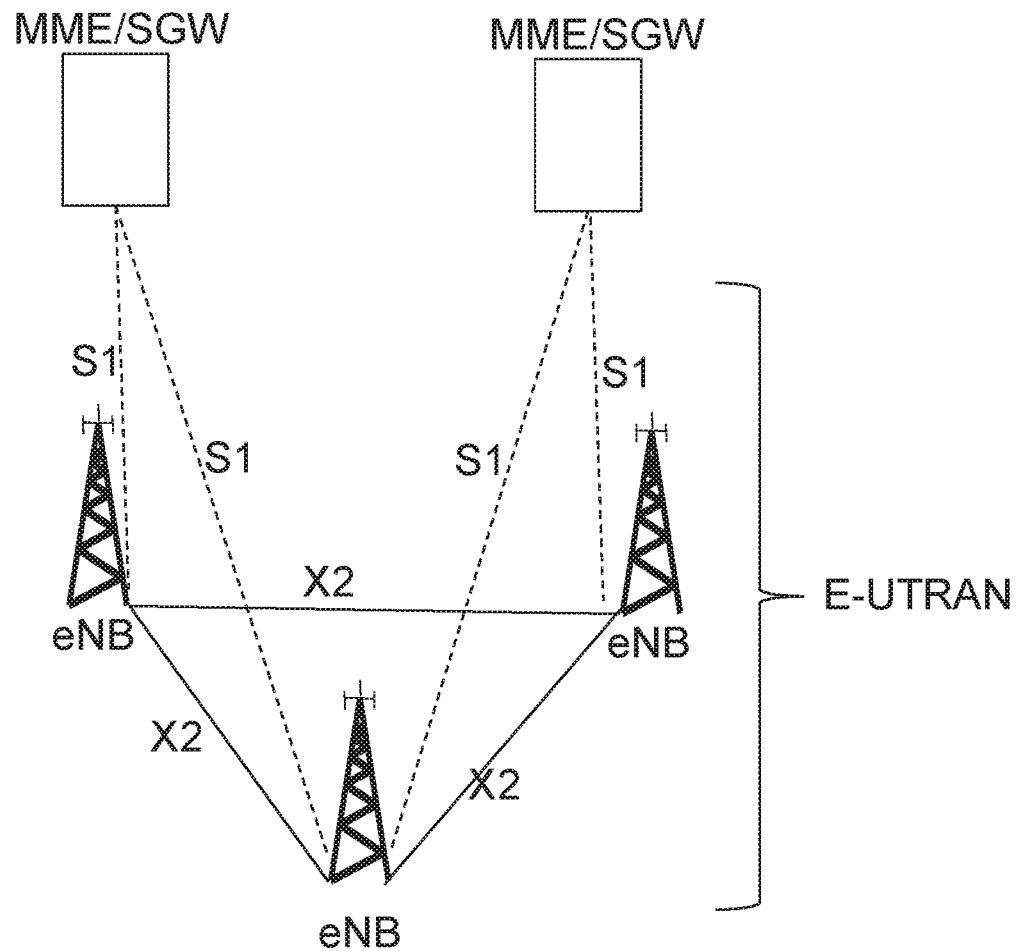
FIG. 2 is a block diagram schematically illustrating an E-UTRAN overall architecture.
Figure 9:
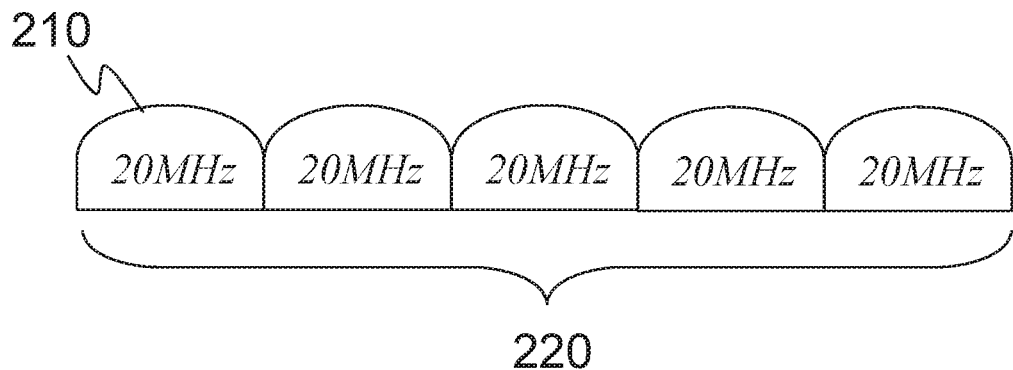
FIG. 9 schematically illustrates CA of five CC.
Figure 3:
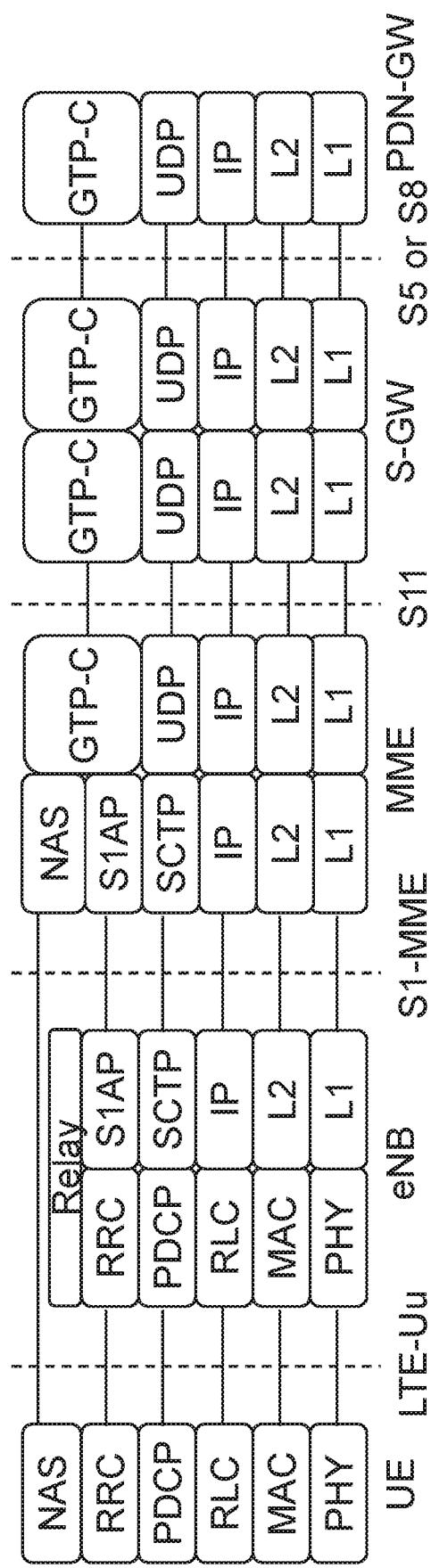
FIG. 3 schematically illustrates an EPC Control Plane protocol architecture.
Figure 4:
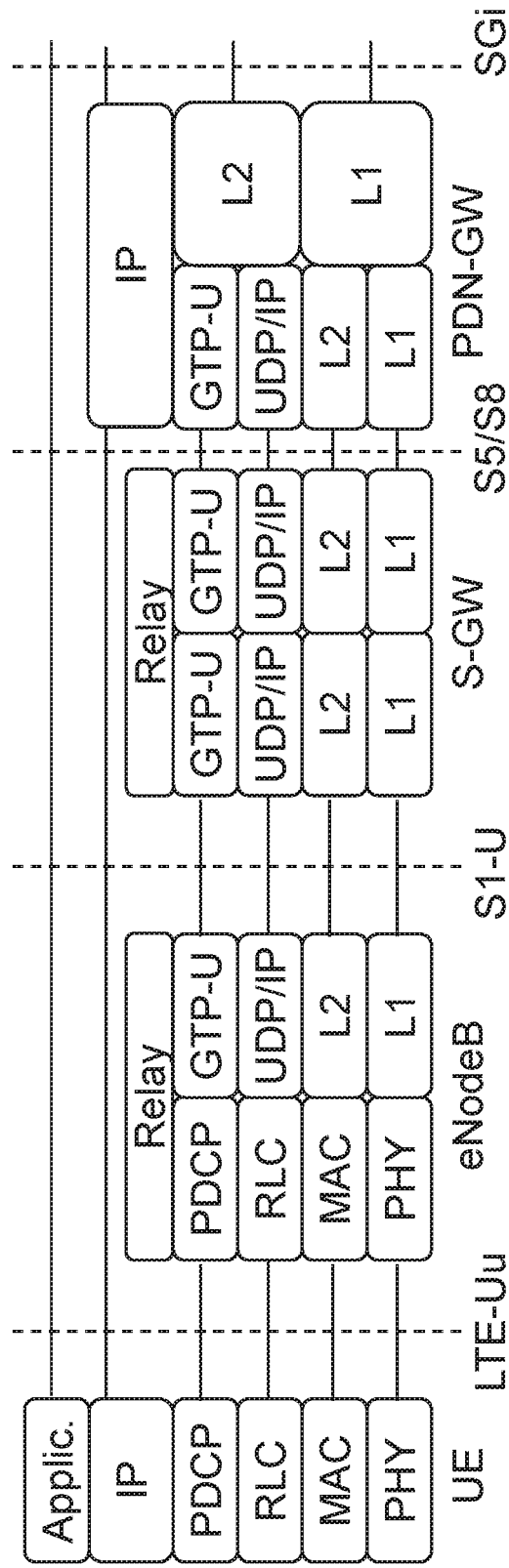
FIG. 4 schematically illustrates an EPC User Plane protocol architecture.
Figure 5:
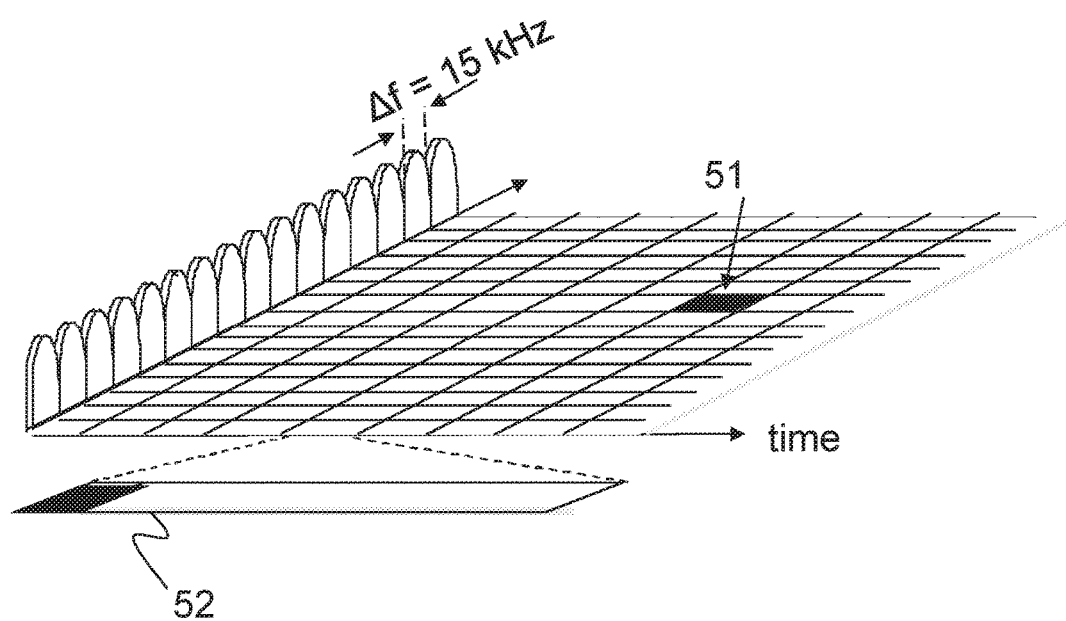
FIG. 5 schematically illustrates the basic LTE DL physical resource.
Figure 6:
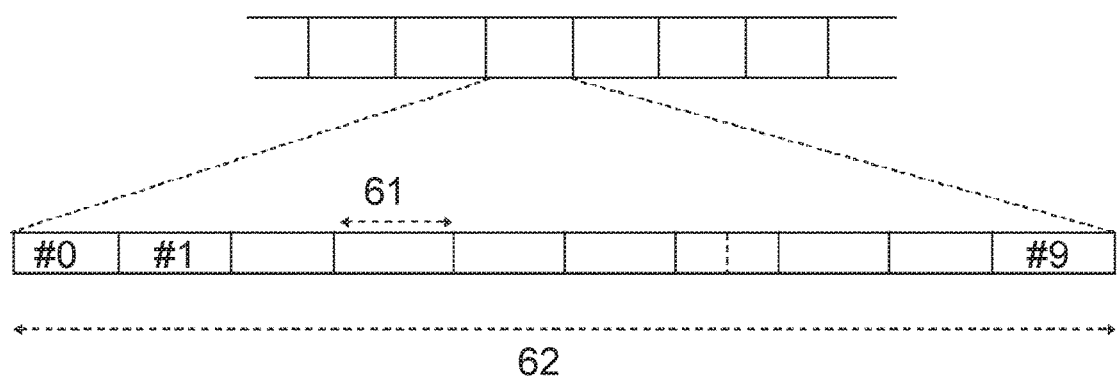
FIG. 6 schematically illustrates an LTE time-domain structure.
Figure 7:
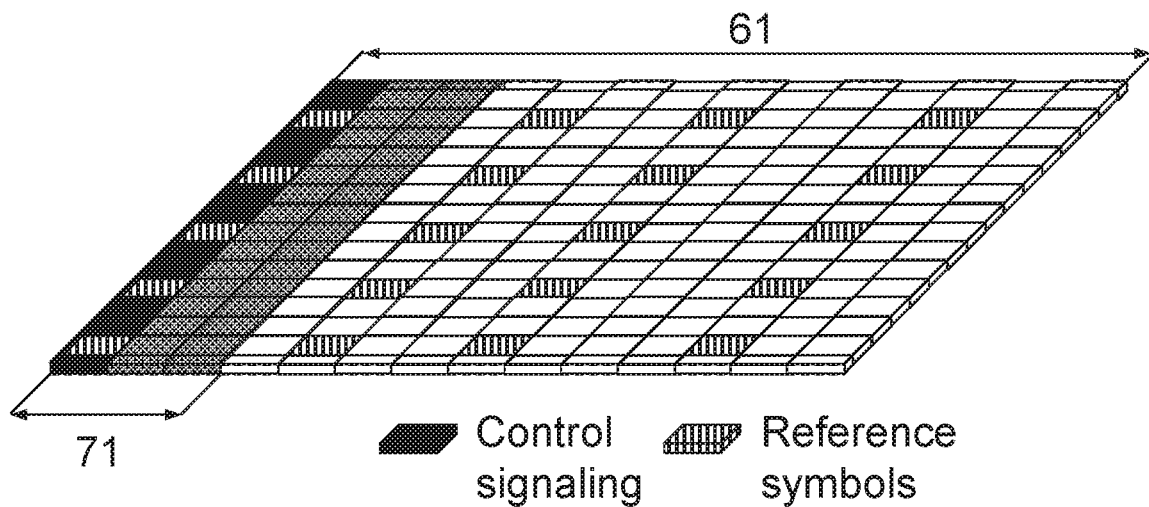
FIG. 7 schematically illustrates a DL subframe.
Figure 8A:
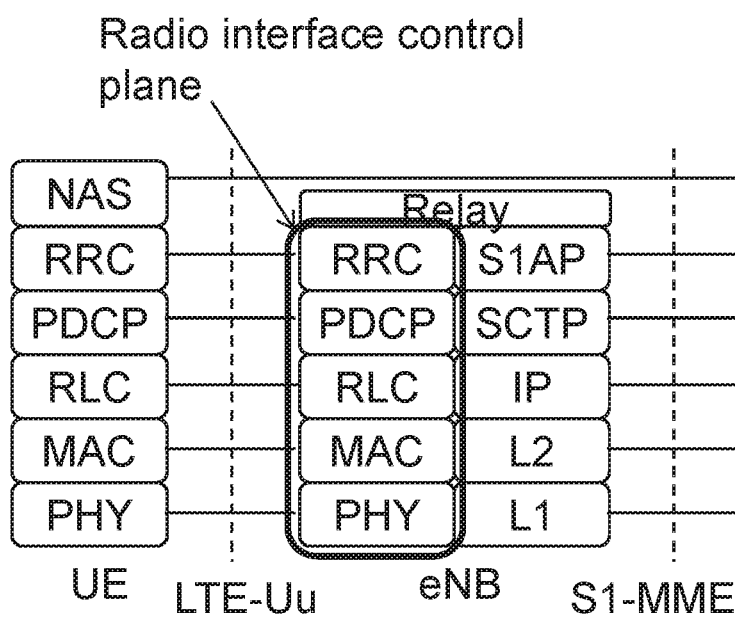
FIGS. 8a and 8b schematically illustrate control and user plane protocol layers for a conventional eNB radio interface.
Figure 8B:
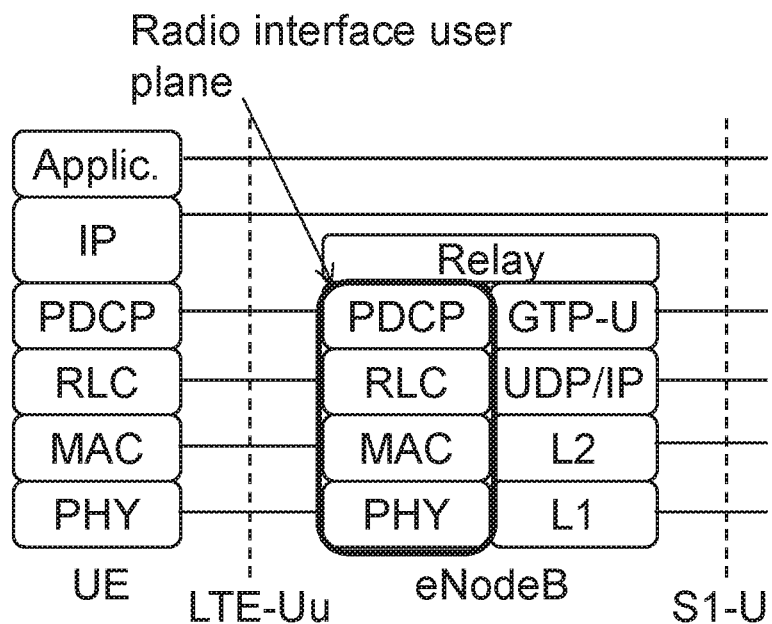
Figure 11:
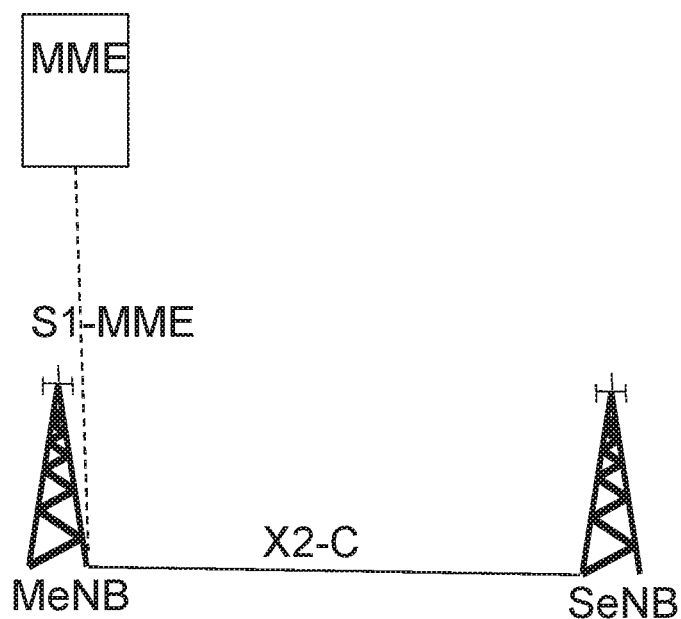
FIG. 11 is a block diagram schematically illustrating C-Plane connectivity of eNBs involved in DC.
Figure 10:
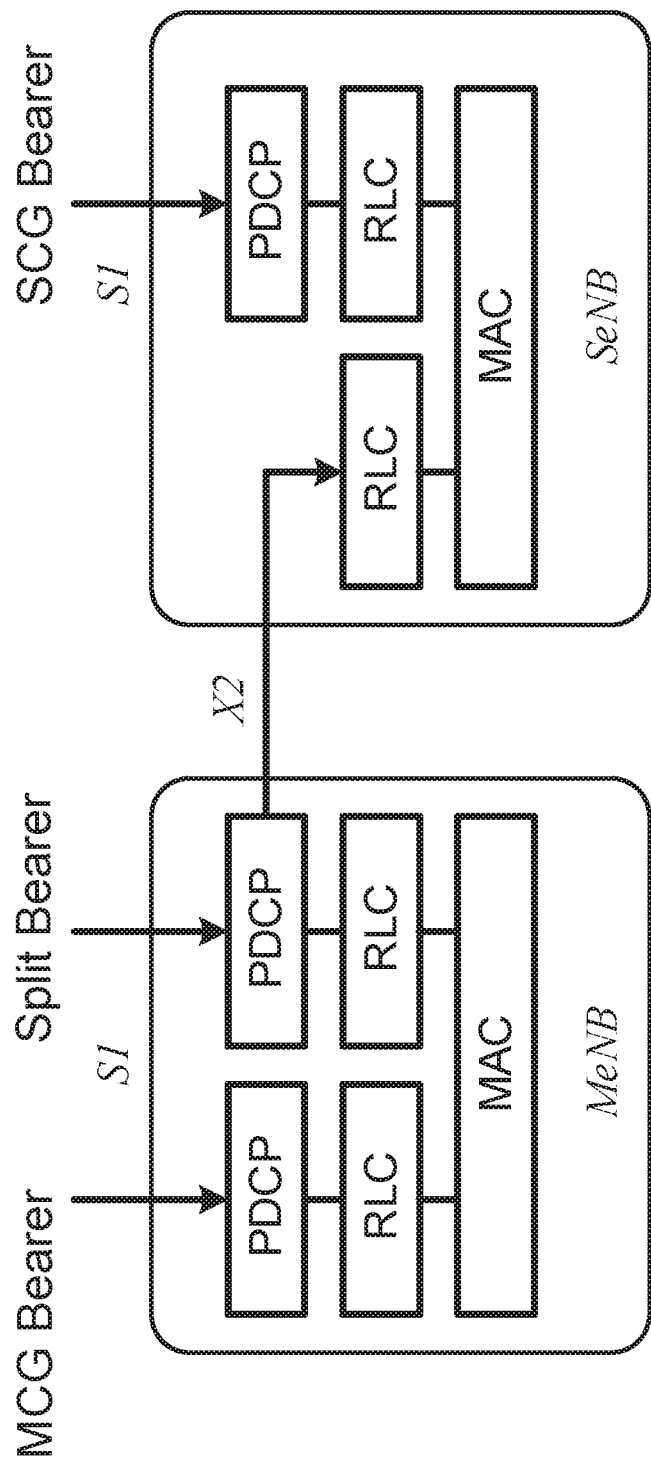
FIG. 10 schematically illustrates a Radio Protocol Architecture for DC.
Figure 12:
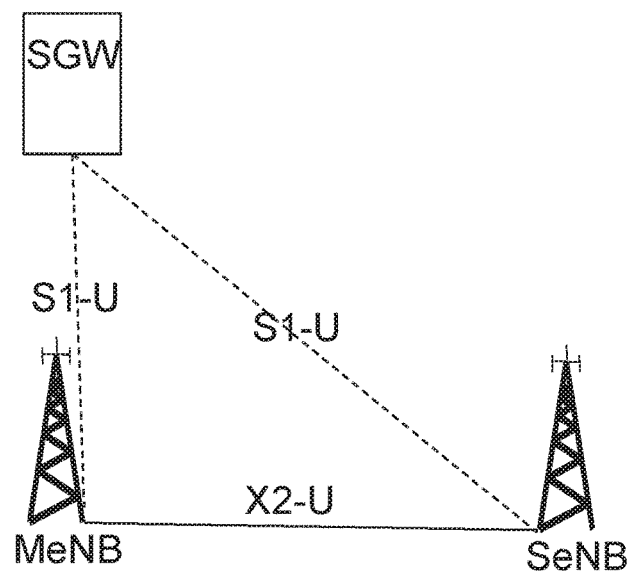
FIG. 12 is a block diagram schematically illustrating U-Plane connectivity of eNBs involved in DC.
Figure 13:
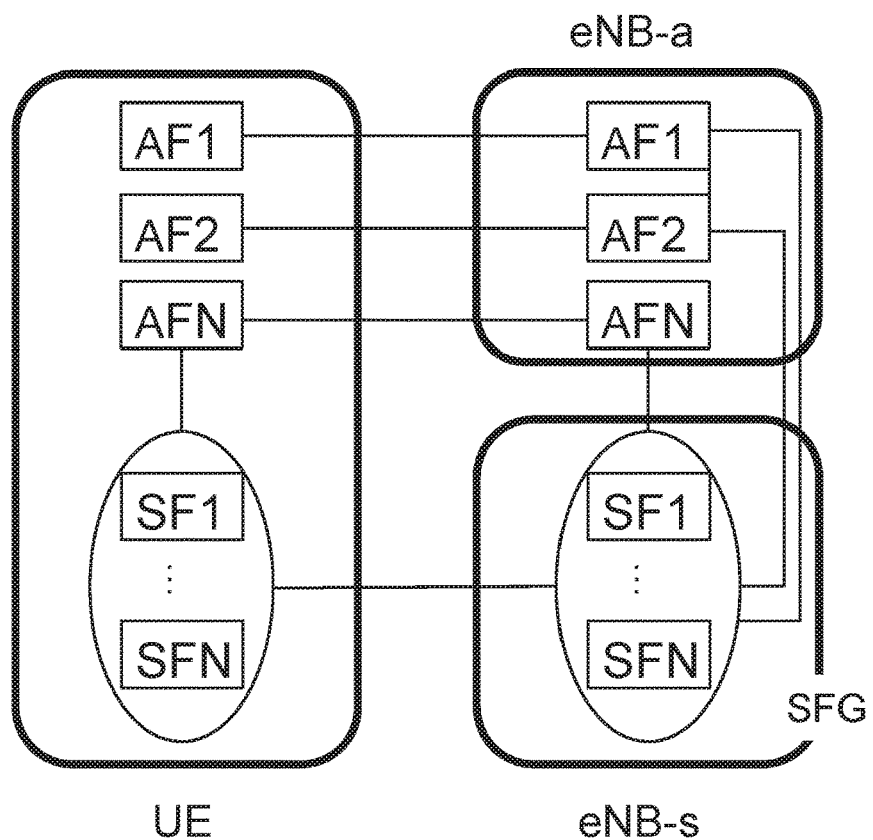
FIG. 13 schematically illustrates one example of a functional split between network elements.
Figure 14A:
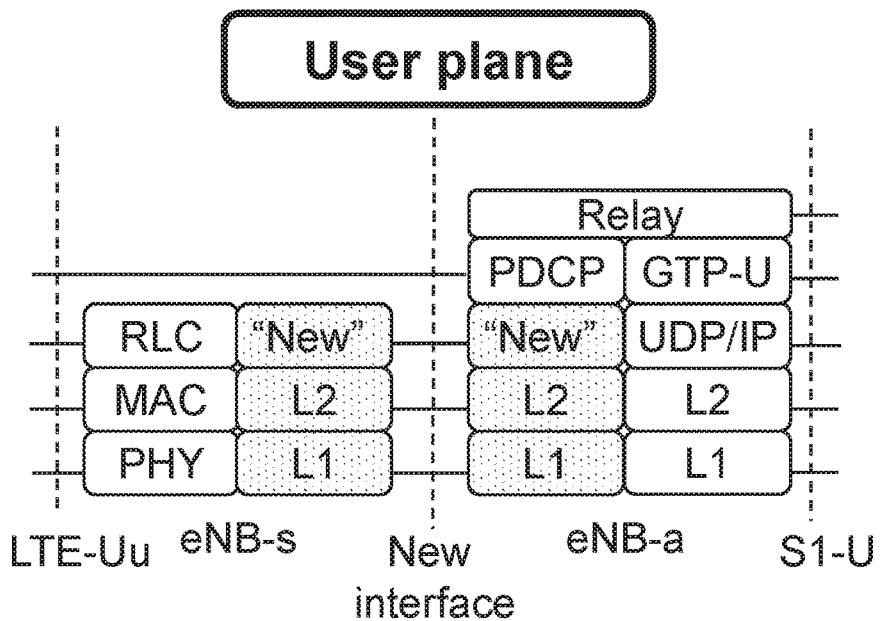
FIGS. 14a and 14b schematically illustrate an eNB split into eNB-a and eNB-s.
Figure 14B:
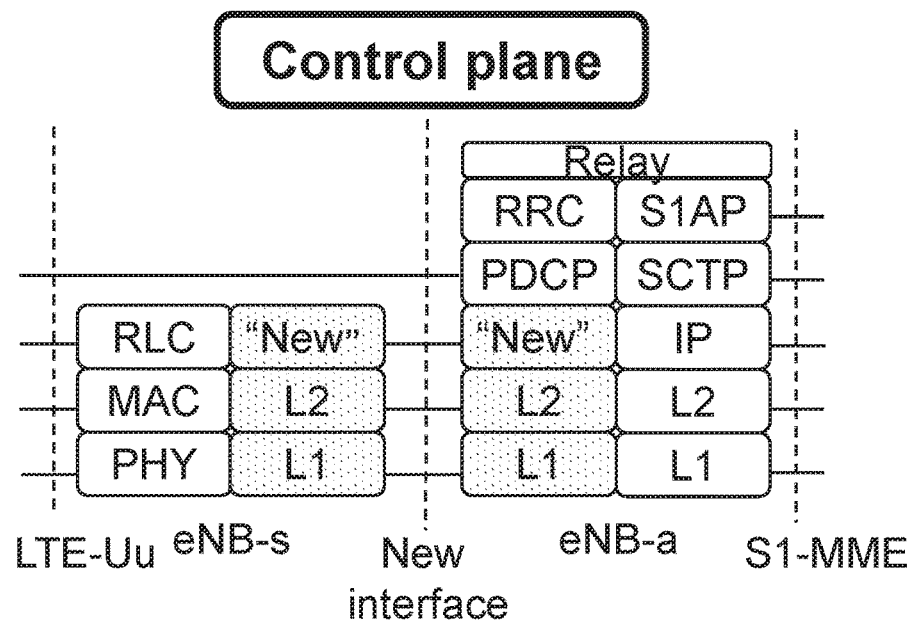

Ongoing discussions in the wireless industry in different for a seem to move towards a direction where the functional architecture of the 5G radio access network should be designed flexibly enough to be deployed on different hardware platforms and possibly on different sites of the network. A functional split as illustrated in FIG. 13 has been proposed. In this example, the RAN functions are classified in synchronous functions (SF) and asynchronous functions (AF). Asynchronous functions are functions with loose timing constraints, and synchronous functions are typically executing time critical functionality. The synchronous network functions have requirements on processing timing which are strictly dependent on timing of a radio link used for communicating with the wireless device. Strictly dependent means that the timing of the radio link is crucial for the synchronous network functions to work as intended. The asynchronous network functions have requirements on processing timing not strictly dependent on the timing of the radio link, or even independent of the timing of the radio link. The synchronous functions may be placed in a logical node called eNB-s and the asynchronous functions may be placed in a logical node called eNB-a. The instances of functions associated to the eNB-s, i.e. the synchronous functions, may be placed at a network element close to the air interface. The synchronous functions will form what is called a synchronous function group (SFG). The instances of the asynchronous functions associated to the eNB-a can be flexibly instantiated either at the network element close to the air interface, i.e. at the same network element as the eNB-s functions or in other network elements such as fixed network nodes (FNNs). If it is assumed that the functions are E-UTRAN functions, the split of functions may lead to the functional architecture for the control plane and the user plane illustrated in FIGS. 14a and 14b, where one new interface will be needed.

Figure 15:
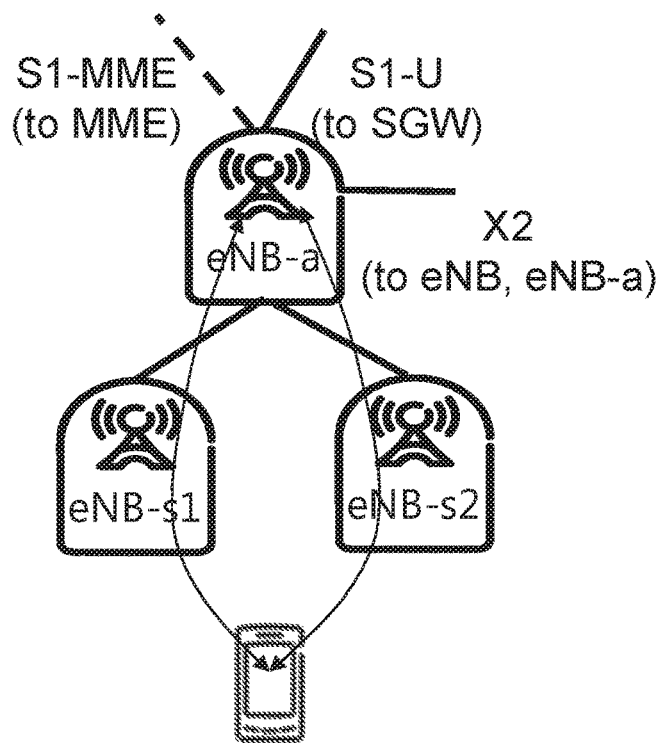
FIG. 15 schematically illustrates DC with functional split established for a wireless device.

In order to support DC or multi-connectivity features, such as user plane aggregation for aggregated data rates, or control/user plane diversity for e.g. reliability and fast packet switching, instances of asynchronous functions can be made common to multiple instances of synchronous functions. In other words, a same instance of a function associated to an eNB-a can control multiple instances of a function associated to an eNB-s. In the case of the current LTE functionality (see section "LTE control and user plane architecture" above), this may lead to common instances for RRC and PDCP functions associated to N multiple instances of RLC/MAC/PHY. N is the number of links that the UE can be connected over at the same time. One example scenario is illustrated In FIG. 15 where the UE is connected over two links via both network element eNB-s1 and network element eNB-s2 to network element eNB-a. The network element eNB-a comprises in general the asynchronous functions, i.e. the protocols that are common for both control plane (RRC and PDCP) and user plane (PDCP).

It is envisioned that 5G radio accesses will be composed by multiple air interfaces, e.g. air interface variants or air interfaces for different RATs. These multiple air interfaces may be tightly integrated, meaning that it is possible to have common function instances for multiple air interfaces. It is also envisioned that one of the air interfaces in a 5G scenario may be LTE-compatible, e.g. an evolution of LTE, while another one is non-LTE compatible. Therefore, in order to address such a multi-RAT integrated architecture, the multi-connection scenario must support network elements or logical nodes from different access technologies. The non-LTE-compatible network elements are likely to support different lower layer protocols than LTE-compatible network elements support, e.g. due to the high frequencies a 5G network is supposed to operate on and the new use cases it is required to address. Therefore standardized CA between LTE and the new 5G radio accesses may not be possible. The standardized DC solution contains different levels of user plane aggregation but no means for Dual Control Plane between two different LTE-carriers or between LTE-compatible and non-LTE-compatible carriers.

Therefore, the previously described functional split between eNB-a and eNB-s can be extended so that the same instance of asynchronous functions are defined for multiple air interfaces, where the UE can be connected over the multiple air interfaces at the same time or during mobility procedures. The multiple air interfaces will then have different synchronous functional groups per air interface, e.g. for compatible-LTE and non-compatible LTE parts of the 5G radio access.

Figure 16:
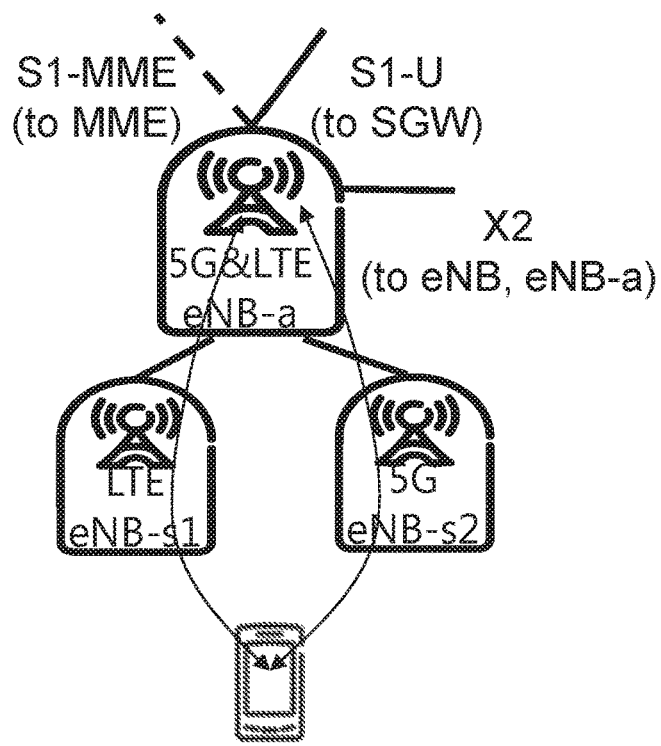
FIG. 16 schematically illustrates a Multi-RAT DC established for a wireless device.

The split illustrated in FIG. 13 may be applied to DC between different RATs, e.g. one LTE RAT and one 5G RAT. In this case the eNB-a can comprise common support for both control and user plane for the asynchronous functions. An eNB-s for each RAT contains the synchronous functions, thus enabling that the synchronous functions are RAT-specific, e.g. different for LTE RAT and 5G RAT. Such a scenario is shown in FIG. 16 where the eNB-a is called "5G & LTE eNB-a" and the eNB-s are called "LTE eNB-s1" and "5G eNB-s2" respectively.

The functional split and RAN architecture such as the one described above with reference to FIGS. 15 and 16, or any other RAN functional split where groups of functions are instantiated in different network elements, implies a possibility to have common function instance(s) associated to multiple network elements and/or links from the same or multiple air interfaces.

Embodiments are described in a non-limiting general context in relation to transmission of a measurement report—being the uplink signaling message—by a UE in the example scenario illustrated in FIG. 15. The UE is connected to the eNB-a over a first and a second wireless link. The network functions serving the UE over the first wireless link are in this example scenario split between eNB-a and eNB-s1, which may be referred to as the first and the second network elements respectively. The network functions serving the UE over the second wireless link are split between eNB-a and eNB-s2, where eNB-s2 may be referred to as the third network element. Some or all of these network elements may be part of a same physical network node, or they may each be separate physical network elements. The network functions are in the example scenario split between eNB-a and eNB-s1/e-NB-s2 based on whether they are asynchronous or synchronous. The same instance of asynchronous functions eNB-a may be defined for multiple air interfaces, where the UE can be connected over the multiple air interfaces corresponding to the two wireless links at the same time. The multiple air interfaces will then be associated with different synchronous function groups per air interface. eNB-s1 and eNB-s2 in FIG. 15 may be from the same RAT, and may be owned by the same operator or by different operators. Alternatively, eNB-s1 and eNB-s2 may be from respective different RATs, e.g. LTE-compatible and non-LTE-compatible 5G accesses, as illustrated in FIG. 16. Also in this second case they may be owned by the same operator or by different operators. The embodiments described herein are mainly given in the context of multiple RATs, for example LTE and 5G RATs. However, the described embodiments may also apply for single RAT cases, especially in the cases when a single eNB-s is connected to multiple different operator networks, as in these cases a single RAT may be used for both the first and second wireless links.

Although the functions in this example scenario are differentiated based on whether they are synchronous or not, it should be noted that embodiments of the invention may be applied to any other network function architecture where the network functions are split into two network elements based on some other criteria than whether the function is synchronous or not. One example is to split functions in a multi-RAT scenario based on whether they are common for the multiple RATs or specific to one of the RATs.

Furthermore, the described embodiments may also apply for a pure DC scenario without the split of the network functions on two network elements. In that case, the wireless device is connected directly to the first network element via the two links, without involving the second and the third network element.

Furthermore, although embodiments are described in relation to a DC scenario, the embodiments may also be applied to a scenario where the UE enters multi-connectivity, where "multi" implies more than dual, i.e. more than two, by adding yet another link that can be from the same or from a different access layer or RAT than the other links. The procedure for transmitting uplink signaling messages in a multi-connectivity scenario is similar to the transmission of uplink signaling messages in the above described DC scenario, and embodiments of the invention may thus easily be applicable to the multi-connectivity scenario.

Transmission Modes

The problem of non-existing procedures for transmitting measurement reports to the network in a DC scenario, e.g. with split functionality such as in the example scenario illustrated in FIG. 16, is addressed by a solution where the UE determines on which wireless link or links to transmit the measurement report. The UE determines a transmission mode among alternative transmission modes for transmitting the measurement report. The alternative transmission modes comprise:

transmitting on the first wireless link;
transmitting on the second wireless link;
transmitting on both wireless links.

The determined transmission mode is then used when transmitting the measurement report.

The transmission mode to transmit on both wireless links is particularly useful for measurement reports that are to be sent once and/or measurement reports which should not be lost, such as event-triggered measurement reports. In addition, if unacknowledged uplink signaling procedures are introduced, the transmission mode to transmit on both wireless links may be suitable for an unacknowledged measurement report. The transmission mode to transmit on one of the wireless links is on the other hand particularly useful for periodic measurement reports. This transmission mode has the advantage of reducing the amount of measurement report transmissions. As will be further described below, what wireless link to choose may be determined in different ways, such as by using a predetermined rule or scheme, e.g. taking into account aspects like channel conditions, nature of the signaling procedure, expected latency, required transmission power and user specific or UE specific policies. In one example, the choice of wireless link for the transmission is based on the type of uplink signaling message or measurement report. In another example, each time a measurement report is to be transmitted the UE autonomously chooses one link randomly or based on e.g. a round-robin rule.

In embodiments, the UE may also determine how to perform retransmissions as part of determining the transmission mode. In one exemplary embodiment, the UE determines to transmit the measurement report on both links. Furthermore, the UE determines to repeatedly retransmit the measurement report on both links and stops retransmitting when getting an acknowledgement (ACK) or a response confirming that the measurement report has been received by the network on one of the links. In another exemplary embodiment, the UE transmits the measurement report on one of the wireless links, and in absence of ACK or response it retransmits the measurement report on the other wireless link. These embodiments increase the robustness for measurement reporting, by introducing diversity for the measurement reports transmitted by the UE.

Figure 17:
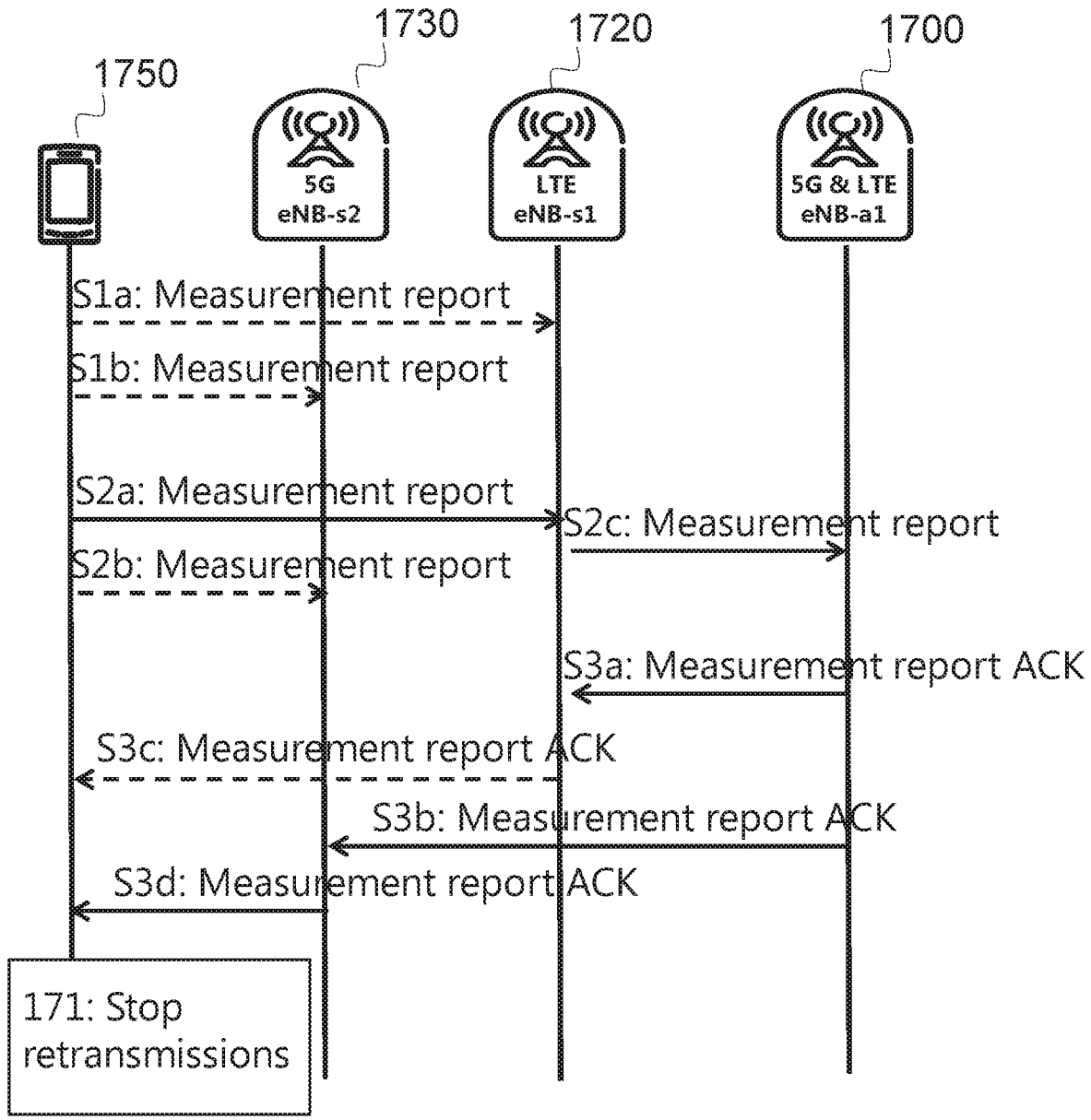
FIG. 17 is a signaling diagram schematically illustrating signaling between UE and network according to embodiments.

FIG. 17 is a signaling diagram illustrating one example of signaling between the UE 1750 and the network in the embodiment where the UE repeatedly transmits the measurement report on both links, and stops transmitting when getting an ACK on one of the links. In S1a and S1b, the UE 1750 transmits a measurement report on each of the links. These messages are both lost (illustrated by dashed signal arrows), i.e. the network never receives the measurement report. In S2a and S2b, the UE 1750 retransmits the measurement reports on both links. The retransmission S2a of the measurement report is received by LTE eNB-s1 1720 over the first link, and is forwarded and received by 5G & LTE eNB-a1 1700 in S2c. 5G & LTE eNB-a1 1700 in turn transmits a Measurement report ACK to the UE 1750 over the two links, in S3a and S3b. In the example, only the Measurement report ACK transmitted over the second link by 5G eNB-s2 1730 is received by the UE 1750 in S3d. The Measurement report ACK transmitted over the first link in S3c is lost. The UE 1750 may already have started a second retransmission of the measurement report (not illustrated) before it receives the Measurement report ACK in S3d. However, when it receives the Measurement report ACK message S3d via the 5G eNB-s2 1730 it stops retransmitting in 171. The above described transmission mode with retransmissions require that the measurement report has a suitable downlink acknowledgement message, such as the Measurement report ACK in this example, which is sent by the network in response to the received Measurement report. This transmission mode with retransmissions is particularly useful in situations where the channel conditions are poor for both wireless links.

Determining the Transmission Mode

In one embodiment of the invention, the determining of the transmission mode is performed autonomously by the UE. In an alternative embodiment, the determining is performed by the network and the network subsequently informs the UE of the determined transmission mode, e.g. through a configuration of the UE using a configuration message such as an RRC Connection Reconfiguration message. However, in another embodiment, determining of the transmission mode is a combination of the two previous embodiments, where the network determines a set of possible transmission modes and configures or informs the UE accordingly, whereby the UE makes the final decision on what transmission mode to use.

The wireless device may determine the transmission mode after the measurement report is generated. However, it may also be performed in the opposite order, i.e. the measurement report is generated after the transmission mode is determined. The transmission mode may e.g. be signaled by the network to the UE in an uplink grant message or a scheduling command. In such a case it may be possible to signal the transmission mode before the generation of every measurement report. In another embodiment, the UE may receive configuration rules as part of an RRC message enabling the UE to determine the transmission mode, and the transmission mode will thus be determined by the UE before the generation of a measurement report. In still another exemplary embodiment, the measurement report is generated by e.g. the RRC layer and is queued by lower layers, and the lower layers may then determine the transmission mode just before the measurement report is delivered.

In the embodiments described above, the determining of transmission mode may be based on one or more criteria for determining the transmission mode. The criteria are listed below. For the embodiment when the UE determines the transmission mode autonomously, it is thus the UE that makes use of the criteria for determining the transmission mode. When it is the network that determines the transmission mode, the network correspondingly uses the criteria for the determination. In some embodiments, both the network and the UE make use of the criteria, which may be the same or different criteria. The criteria used respectively by the network and the UE may differ, because the network and the UE may not have access to the same information. In the below list of criteria, each criterion is applicable for both the UE and the network when not stated otherwise.

List of Criteria for Determining Transmission Mode

Channel Quality

The channel quality of the wireless links over which the UE is connected to the network may be used as criterion for determining the transmission mode. The UE and/or the network may measure the channel quality of either a subset of or all of the wireless links. If the network is measuring the channel quality, the UE may receive reports or indications of the channel quality from the network. The UE or the network may use the channel quality to determine the transmission mode, and thereby increasing the probability for a transmitted measurement report to reach the network. In one exemplary embodiment, the UE may determine to transmit the measurement report on the first wireless link if the channel quality of the first wireless link is better than the channel quality of the second wireless link, and if the channel quality of the first wireless link is above a quality threshold. In another embodiment, the UE may determine to transmit the measurement report on both the first and the second wireless link if the channel quality of the first wireless link is similar to the channel quality of the second wireless link, and if the channel quality of the first and the second wireless links is equal to or lower than the quality threshold. The channel quality may be determined to be similar e.g. when the channel quality difference is less than a given value. In this latter embodiment, the UE may optionally determine that the measurement report shall be retransmitted on both links until an acknowledgement message has been received from the network on either of the links. This may e.g. be determined when the measurement report to transmit is categorized as "important", which may be done depending on the type of measurement report and the situation (see e.g. below in the list of criteria under "Type of uplink signaling message"). An example of such an "important" measurement report is an event triggered measurement report, which supposedly will trigger a handover because of the poor channel quality of both wireless links and therefore is important with regards to performance.

Load

The load on the wireless links over which the UE is connected to the network may be used as criterion for determining the transmission mode. The UE and/or the network may use the load of both or either of the links when selecting the transmission mode. This makes it possible to reduce the load impact on the system for transmitting measurement reports. The load of a given link can be obtained by e.g. measuring the received signal power on the uplink frequency band. Alternatively, the load can be obtained by checking the throughput or the size of the scheduling queues.

UE Capability

The UE capability may be used as criterion for determining the transmission mode. The UE may e.g. be capable of using the first wireless link but not the second wireless link, and may thus determine to transmit the measurement report only on the first wireless link. As one example this may be the case when the two links correspond to two different RATs respectively such as one LTE compatible and one non-LTE compatible RAT, and the UE is LTE capable only.

Resiliency/Redundancy/Robustness

Resiliency, redundancy, or robustness requirements may be used as criterion for determining the transmission mode. The UE may e.g. determine to transmit the measurement report on one of the links, and may then—for robustness reasons—determine to retransmit the measurement report on the other link if no acknowledgement is received.

Service Requirement/QoS

The requirements of an active service or the QoS of the bearer, which may be the only way the RAN is aware of the service requirements, may govern the determining of transmission mode. For instance, transmitting the same packets on both wireless links simultaneously may be chosen if robustness and/or low latency is required by the service and retransmissions therefore should be avoided. Another example is to transmit different packets on different wireless links to increase the throughput. This may apply specifically for the case when different QoS can be signaled for the signaling bearers of different UEs.

Latency

The latency of the wireless links over which the UE is connected to the network may be used as criterion for determining the transmission mode. In one example, the measurement report is transmitted on the wireless link with the lowest latency. In order to obtain the latency of a link, the UE may in one example transmit an Internet Protocol version 4 (IPv4) ping on the two links and compare the ping responses. Another example of how to obtain a latency value for the links is to use pre-configured (e.g. hardcoded) values of an assumed latency ranking order for different links in case the two links use different RATs respectively.

Type of Uplink Signaling Message

The type of the uplink signaling message that is to be transmitted/received can be used as input for determining the transmission mode. In one example, the transmission mode for a measurement report is determined to be to transmit on one of the wireless links, while the transmission mode for all other uplink signaling messages is determined to be to transmit on both wireless links. In general, the choice of transmission mode may depend on the importance or urgency of the uplink signaling message, or it may depend on whether an acknowledgement is expected for the uplink signaling message or not.

In case the uplink signaling message is a measurement report, the transmission mode may be determined based on the type of measurement report. In one example, the transmission mode for a periodic measurement report is determined to be to transmit on one of the links, while the transmission mode for an event-triggered measurement report is determined to be to transmit on both of the links.

Transmission Mode of Corresponding Downlink Signaling Message

In case the uplink signaling message is a response to a downlink message, the transmission mode may be determined based on the transmission mode used for the downlink. For instance, the uplink message may be transmitted on the same wireless link or links as the downlink message was received on. Alternatively, the UE may be configured to transmit the uplink signaling message on a certain other link than the link the downlink message was received on (uplink-downlink separation). The network may determine the transmission mode when a downlink signaling message is to be transmitted, and configure the UE with the transmission mode implicitly by transmitting the downlink signaling message on a given wireless link.

Acknowledgment of Uplink Signaling Message

Another alternative embodiment is to determine the transmission mode based on whether the uplink signaling message is acknowledged or responded to by the receiver in the network according to the specified signaling protocol. For instance, the UE may transmit an uplink signaling message to be acknowledged on one wireless link, while an uplink signaling message for which no acknowledgement is expected is transmitted on both wireless links.

Carrier Aggregation (CA)

The uplink usage of each of the wireless links may be a criterion to use for determining transmission mode. The uplink usage may e.g. be that they use LTE and 5G CA or dual connectivity. For example, if CA is applied on the LTE-side, in addition to dual connectivity between LTE and 5G, then a message can be sent only via LTE. CA positively affects the performance of the LTE link, and therefore the LTE link is preferred.

Backhaul Quality

The backhaul quality from 5G eNB-s2 to eNB-a1 and the backhaul quality from LTE eNB-s1 to eNB-a1 may be used as criteria for determining the transmission mode. The principle is that the backhaul with the better quality is prioritized over the backhaul with the lower quality. The eNB-a1 can measure the links to the different eNB-s1 and eNB-s2, and the UE may be informed about the backhaul quality of a particular link, e.g. via broadcast or dedicated signaling.

Mobility/Speed of UE

The mobility or speed of the UE may be used as criteria for determining the transmission mode. If the UE is moving fast, for example when the UE's speed is measured to be above a specified limit, or when the UE is identified to be in a specific mobility state, a wireless link corresponding to the widest coverage area of the different links is preferred. For example, an LTE link may be preferred in the case when LTE is deployed on a lower frequency band than the frequency band of the 5G link.

QoS

Agreed or expected QoS on the different links may be used as criteria for determining the transmission mode. The different links may be associated with different QoS through explicit signaling. Alternatively, the QoS may be measured for the different links.

Predetermined Rule

A predetermined rule, such as a round-robin rule, may be used to determine the transmission mode. One example of a predetermined rule is to determine that the UE transmits every second measurement report on the first wireless link, and every other second measurement report on the second wireless link.

Random Selection

The criterion for determining the transmission mode may be to randomly select one wireless link between the available wireless links for the transmission of the measurement report.

Embodiments of Methods Described with Reference to FIGS. 18a Through 18e and 19

Figure 18A:
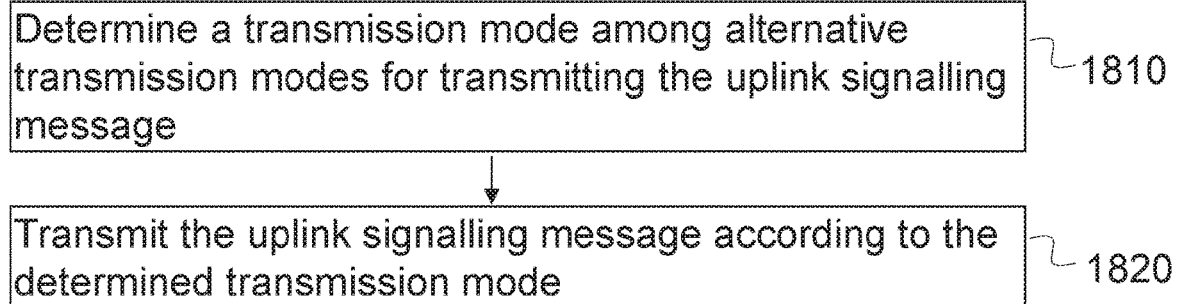
FIGS. 18a through 18e are flow charts schematically illustrating embodiments of a method for a wireless device according to various embodiments.

FIG. 18a is a flowchart illustrating one embodiment of a method for transmitting an uplink signaling message in a wireless communication network. A wireless device is connected to a first network element over at least a first and a second wireless link. The wireless device may be any kind of device such as a UE, a mobile terminal, a sensor, or a laptop. The method is performed in the wireless device and comprises:

1810: Determining a transmission mode among alternative transmission modes for transmitting the uplink signaling message. The alternative transmission modes comprise: transmitting on the first wireless link; transmitting on the second wireless link; and transmitting on both the first and the second wireless links. The advantages of the different transmission modes are further described in the section "Transmission modes" above. In embodiments, the determining of the transmission mode is based on criteria for determining transmission mode.

1820: Transmitting the uplink signaling message according to the determined transmission mode.

In the section "Determining the transmission modes" above, different embodiments related to how the determining may be done are described. The determining may e.g. be performed autonomously by the wireless device, may be performed solely by the network which then configures the wireless device to transmit accordingly, or it may be a combined determining by both the network and the wireless device. The network may have better knowledge than the wireless device of certain criteria for determining the transmission mode or vice versa. The embodiments described below with reference to FIGS. 18b and 18c explain some of these alternative embodiments.

Figure 18B:
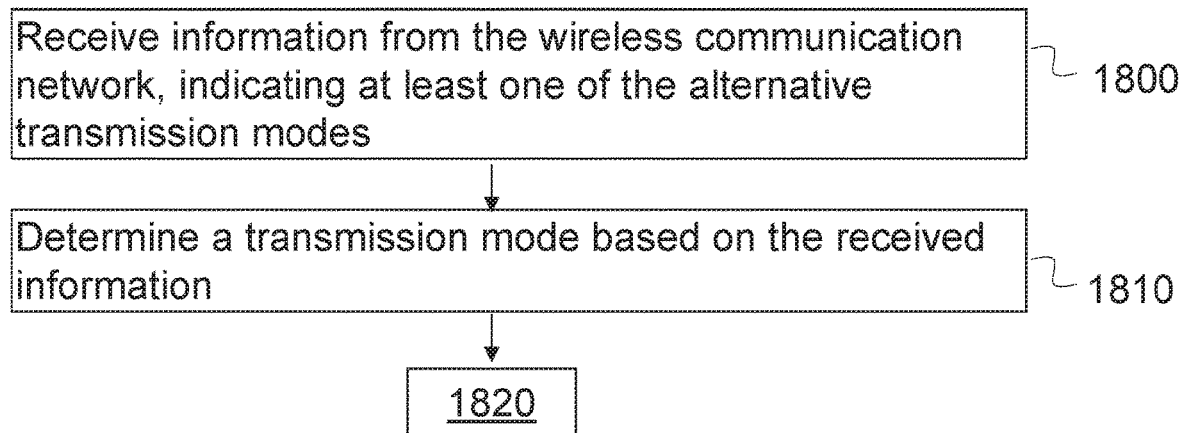

FIG. 18b is a flowchart illustrating an embodiment of the method in the wireless device, where the network transmits information to the wireless device that enables the device to determine the transmission mode based on some criteria. The network may e.g. send an indication of two transmission modes to the wireless device, and the wireless device may then determine or select one of the indicated transmission modes based on some criteria for determining the transmission mode. The method may in this embodiment comprise:

1800: Receiving information from the first network element, indicating at least one of the alternative transmission modes. Although the first network element is involved in the transmission of the information to the wireless device, the origin of the information may be another network node of the wireless communication network.

1810: Determining the transmission mode based on the received information. In embodiments, the determining of the transmission mode is based on criteria for determining transmission mode. The criteria may e.g. be channel quality measured by the wireless device.

1820: Transmitting the uplink signaling message according to the determined transmission mode.

Figure 18C:
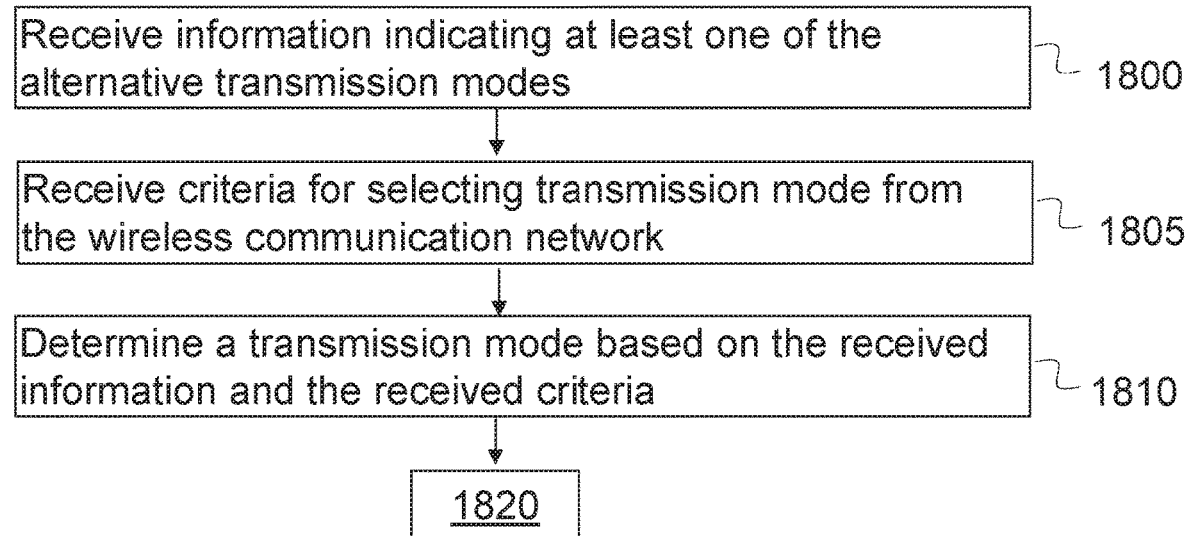

FIG. 18c is a flowchart illustrating another embodiment of the method in the wireless device, where the network transmits both the transmission mode indications and the criteria for determining the transmission mode. This enables the wireless device to determine the transmission mode based on the information from the network. The network may e.g. transmit two alternative transmission modes as well as load values for the two links, and the wireless device can then determine the best transmission mode, given the type of uplink signaling message to transmit, based on the received information from the network. The method may thus comprise:

1800: Receiving information from the first network element, indicating at least one of the alternative transmission modes.

1805: Receiving criteria for determining transmission mode from the first network element.

1810: Determining the transmission mode based on the received information and the received criteria for determining transmission mode. The determining may also be based on criteria for determining transmission mode known by the wireless device, such as the type of uplink signaling message to transmit.

1820: Transmitting the uplink signaling message according to the determined transmission mode.

Figure 18D:
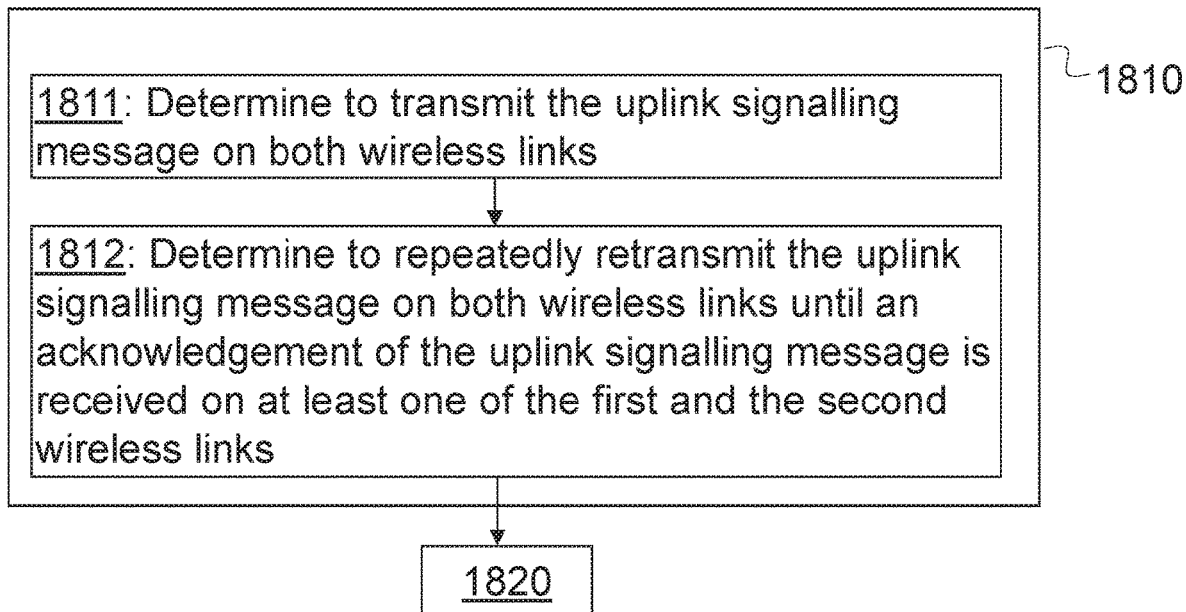

As described in the section "Transmission modes" above, determining the transmission mode may also comprise determining on which link to retransmit the uplink signaling message. FIG. 18d is a flowchart illustrating one such embodiment of the method in the wireless device which may be combined with any of the above described embodiments. In this embodiment, the determining 1810 of the transmission mode may comprise:

1811: Determining to transmit the uplink signaling message on both the first and the second wireless links.

1812: Determining to repeatedly retransmit the uplink signaling message on both wireless links until an acknowledgement of the uplink signaling message is received on at least one of the first and the second wireless links.

Figure 18E:
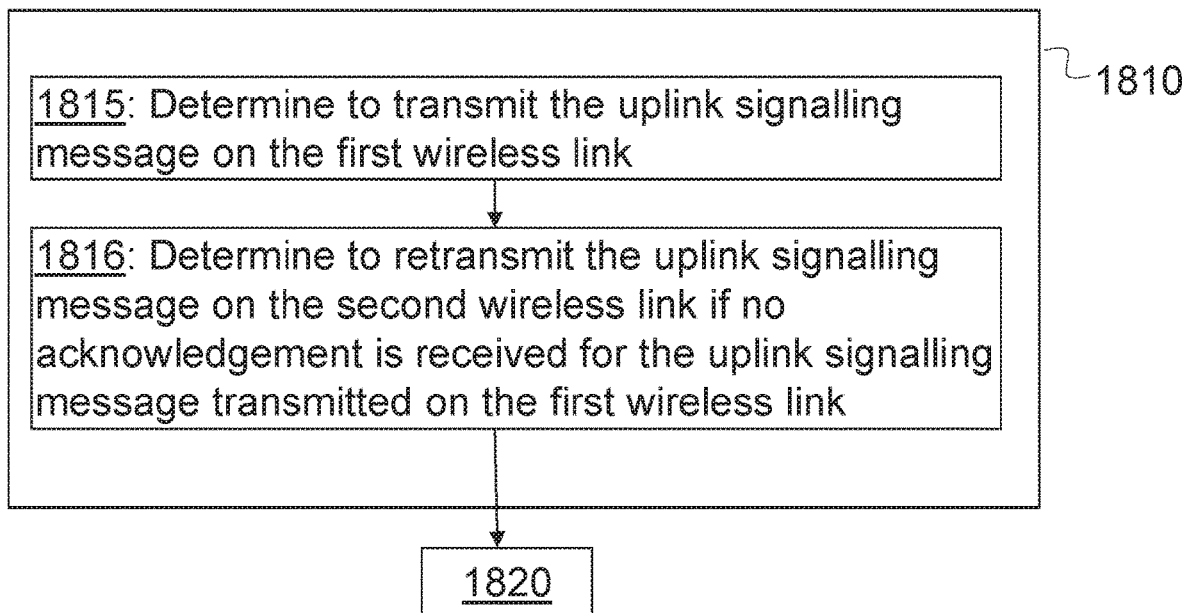

Furthermore, the method may comprise the transmitting 1820 of the uplink signaling message according to the determined transmission mode, i.e. first transmitting on both links and then retransmitting on both links if no acknowledgement is received for the first transmission. FIG. 18e is a flowchart illustrating another such embodiment of the method in the wireless device which may be combined with any of the embodiments described with reference to FIGS. 18a through 18c. In this embodiment, the determining 1810 of the transmission mode may comprise:

1815: Determining to transmit the uplink signaling message on the first wireless link.

1816: Determining to retransmit the uplink signaling message on the second wireless link if no acknowledgement is received for the uplink signaling message transmitted on the first wireless link.

Furthermore, the method may comprise the transmitting 1820 of the uplink signaling message according to the determined transmission mode, i.e. first transmitting on one link and retransmitting on the other link if no acknowledgement is received for the first transmission.

In any of the embodiments of the method in the wireless device described with reference to FIGS. 18a through 18e, the criteria for determining transmission mode may be related to at least one of the following:

a channel quality of at least one of the first and the second wireless links;

a load on at least one of the first and the second wireless links;

a wireless device capability of using at least one of the first and the second wireless links;

a quality of service of a bearer associated with the uplink signaling message;

a latency of at least one of the first and the second wireless links;

a type of uplink signaling message;

a transmission mode of a downlink signaling message to which the uplink signaling message is a response;

whether the uplink signaling message is acknowledged or not;

use of carrier aggregation on at least one of the first and the second wireless links;

a speed of the wireless device;

a quality of service associated with at least one of the first and the second wireless links;

a pre-determined rule for determining the transmission mode;

a random selection of at least one of the first and the second wireless links.

Furthermore, in any of the embodiments described above, the determining 1810 of the transmission mode may comprise obtaining the channel quality of at least one of the first and the second wireless links and determining the transmission mode based on the obtained channel quality. The obtaining of the channel quality may comprise at least one of measuring the channel quality and receiving the channel quality from the first network element.

In one embodiment, the channel quality of both the first and the second wireless links are obtained. The determining 1810 of the transmission mode based on the obtained channel quality may then comprise determining to transmit the uplink signaling message on the wireless link with highest obtained channel quality, when the highest obtained channel quality is equal to or above a threshold value. On the other hand, when the highest obtained channel quality is below the threshold value, the determining 1810 of the transmission mode may comprise determining to transmit the uplink signaling message on both the first and the second wireless links.

FIG. 19 is a flowchart illustrating one embodiment of a method for enabling a wireless device to transmit an uplink signaling message in a wireless communication network. The wireless device is connected to a first network element over at least a first and a second wireless link. The method is performed in the first network element and comprises:

1910: Determining at least one transmission mode among alternative transmission modes for transmitting the uplink signaling message. The alternative transmission modes comprise: transmitting on the first wireless link; transmitting on the second wireless link; and transmitting on both the first and the second wireless links. The determining of at least one transmission mode is based on criteria for determining transmission mode.

1920: Transmitting information to the wireless device enabling the wireless device to determine transmission mode for transmitting the uplink signaling message, the information comprising an indication of the determined at least one transmission mode. The transmitted information may further comprise the criteria for determining transmission mode.

The method may in embodiments also comprise receiving the uplink signaling message from the wireless device in accordance with one of the alternative transmission modes.

The criteria for determining transmission mode may be related to at least one of the following:
- a channel quality of at least one of the first and the second wireless links;
- a load on at least one of the first and the second wireless links;
- a wireless device capability of using at least one of the first and the second wireless links;
- a quality of service of a bearer associated with the uplink signaling message;
- a latency of at least one of the first and the second wireless links;
- a type of uplink signaling message;
- a transmission mode of a downlink signaling message to which the uplink signaling message is a response;
- whether the uplink signaling message is acknowledged or not;
- use of carrier aggregation on at least one of the first and the second wireless links;
- a speed of the wireless device;
- a quality of service associated with at least one of the first and the second wireless links;
- a pre-determined rule for determining the transmission mode;
- a random selection of at least one of the first and the second wireless links.

As already mentioned, the uplink signaling message may in any of the embodiments described above be a measurement report. Furthermore, the first and the second wireless links may be both associated with one RAT, or each associated with respective different RATs as described with reference to FIGS. 15 and 16.

The functionality split described e.g. with reference to FIG. 13 above may also be applied in embodiments. In such an embodiment, network functions serving the wireless device over the first wireless link are split between the first network element and a second network element. Network functions serving the wireless device over the second wireless link are split between the first network element and a third network element. In the example scenario in FIGS. 15 and 16 the first network element corresponds to the eNB-a, the second network element corresponds to eNB-s1, and the third network element corresponds to eNB-s2. As described above, the network functions of the first network element may be asynchronous network functions, and the network functions of the second and third network elements may be synchronous network functions. The synchronous network functions of the second network element may have requirements on processing timing which are strictly dependent on timing of the first wireless link. The synchronous network functions of the third network element may have requirements on processing timing which are strictly dependent on timing of the second wireless link. Furthermore, the asynchronous network functions may have requirements on processing timing not strictly dependent on the timing of any of the first or second wireless links.

Embodiments of Apparatus Described with Reference to FIGS. 20*a* Through 20*c* Wireless Device An embodiment of a wireless device 2050 is schematically illustrated in the block diagram in FIG. 20*a*. The wireless device is configured to transmit an uplink signaling message in a wireless communication network. The wireless device 2050 is connectable to a first network element 2000 over at least a first and a second wireless link. The wireless device 2050 is further configured to determine a transmission mode among alternative transmission modes for transmitting the uplink signaling message. The alternative transmission modes comprise: transmitting on the first wireless link; transmitting on the second wireless link; and transmitting on both the first and the second wireless links. The wireless device 2050 is also configured to transmit the uplink signaling message according to the determined transmission mode.

In embodiments, the wireless device 2050 may be further configured to receive information from the first network element 2000, indicating at least one of the alternative transmission modes, and to determine the transmission mode based on the received information. The wireless device 2050 may be configured to determine the transmission mode based on criteria for determining transmission mode. As another option, the wireless device 2050 may be configured to receive the criteria for determining transmission mode from the first network element 2000.

In other embodiments, the wireless device 2050 may be configured to determine the transmission mode by being configured to obtain the channel quality of at least one of the first and the second wireless links, and determine the transmission mode based on the obtained channel quality. The obtaining may comprise at least one of measuring the channel quality and receiving the channel quality from the first network element 2000. In embodiments, the wireless device 2050 may be further configured to obtain the channel quality of both the first and the second wireless links, and to determine the transmission mode based on the obtained channel quality by being configured to determine to transmit the uplink signaling message on the wireless link with highest obtained channel quality, when the highest obtained channel quality is equal to or above a threshold value. When the highest obtained channel quality is below the threshold value, the wireless device 2050 may be further configured to determine the transmission mode based on the obtained channel quality by being configured to determine to transmit the uplink signaling message on both the first and the second wireless links.

In embodiments, the wireless device 2050 may be further configured to determine the transmission mode by being configured to determine to transmit the uplink signaling message on both the first and the second wireless links, and determine to repeatedly retransmit the uplink signaling message on both wireless links until an acknowledgement of the uplink signaling message is received on at least one of the first and the second wireless links.

As an alternative, the wireless device 2050 may be further configured to determine the transmission mode by being configured to determine to transmit the uplink signaling message on the first wireless link, and determine to retransmit the uplink signaling message on the second wireless link if no acknowledgement is received for the uplink signaling message transmitted on the first wireless link.

In any of the embodiments above, the uplink signaling message may be a measurement report. Furthermore, the first and the second wireless links may be both associated with one RAT, or each associated with respective different RATs.

The functionality split described e.g. with reference to FIG. 13 above may also be applied in embodiments. In such an embodiment, network functions serving the wireless device over the first wireless link are split between the first network element and a second network element. Network functions serving the wireless device over the second wireless link are split between the first network element and a third network element. In the example scenario in FIGS. 15 and 16 the first network element corresponds to the eNB-a, the second network element corresponds to eNB-s1, and the third network element corresponds to eNB-s2. As described above, the network functions of the first network element may be asynchronous network functions, and the network functions of the second and third network elements may be synchronous network functions. The synchronous network functions of the second network element may have requirements on processing timing which are strictly dependent on timing of the first wireless link. The synchronous network functions of the third network element may have requirements on processing timing which are strictly dependent on timing of the second wireless link. Furthermore, the asynchronous network functions may have requirements on processing timing not strictly dependent on the timing of any of the first or second wireless links.

Figure 20A:
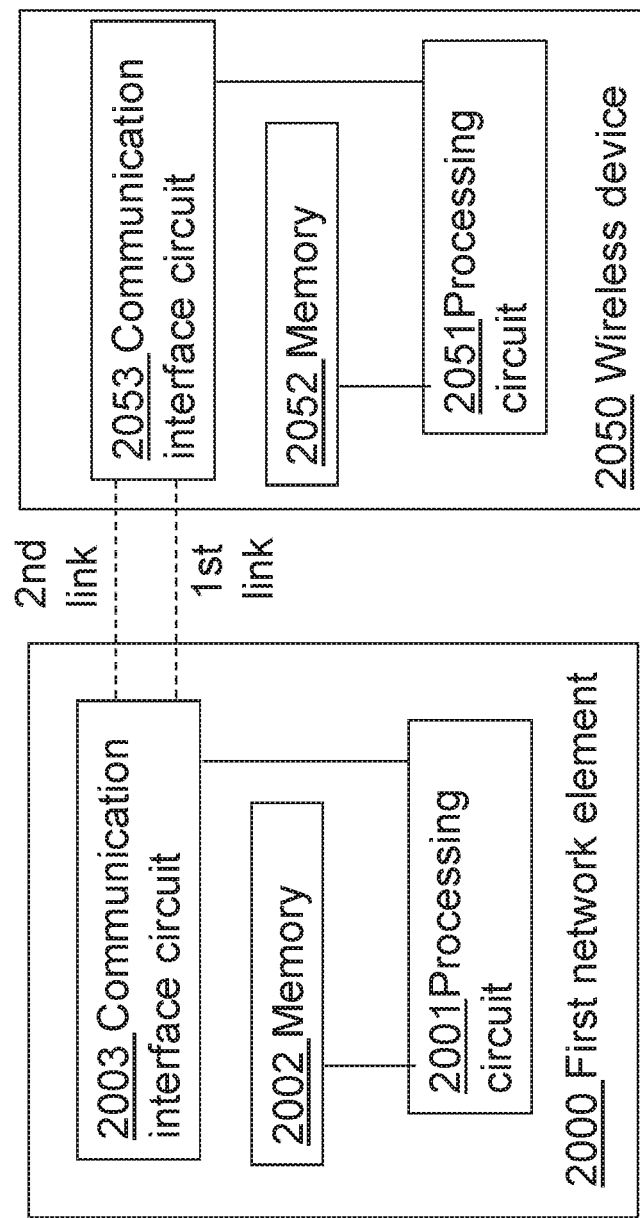
FIGS. 20a through 20c are block diagrams schematically illustrating embodiments of the wireless device and the network element according to various embodiments.

As illustrated in FIG. 20*a*, the wireless device 2050 may comprise a processing circuit 2051 and a memory 2052 in embodiments of the invention. The wireless device 2050 may also comprise a communication interface circuit 2053 configured to communicate with the first network element over the first and second wireless links. The communication interface circuit 2053 may in embodiments comprise a transceiver adapted to communicate wirelessly with the network. The memory 2052 may contain instructions executable by said processing circuit 2051, whereby the wireless device 2050 may be operative to determine a transmission mode among alternative transmission modes for transmitting the uplink signaling message, as described above. The wireless device 2050 may also be operative to transmit the uplink signaling message according to the determined transmission mode, via the communication interface circuit 2053.

Figure 20B:
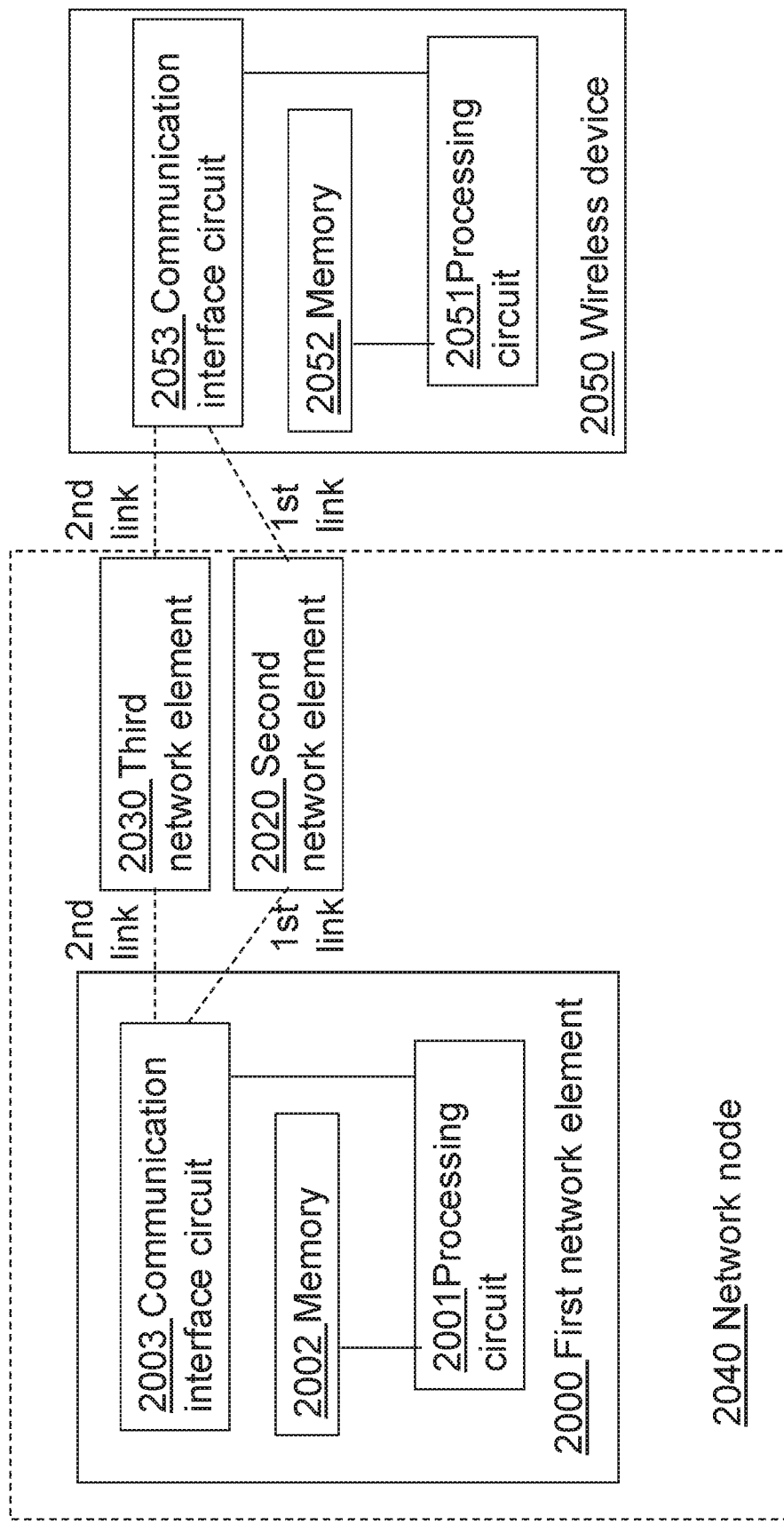

The functionality split embodiment is illustrated in FIG. 20*b*. In such an embodiment, network functions serving the wireless device 2050 over the first wireless link are split between the first network element 2000 and a second network element 2020. Network functions serving the wireless device 2050 over the second wireless link are split between the first network element 2000 and a third network element 2030. Furthermore, FIG. 20*b* illustrates that the first, second and third network elements, 2000, 2020, 2030, may be part of one physical network node 2040. However, any other physical deployment or grouping of the network elements is possible. They may e.g. all be separate physical nodes, or the second and the third network element may be part of the same physical network node although separate from the first network element.

Figure 20C:
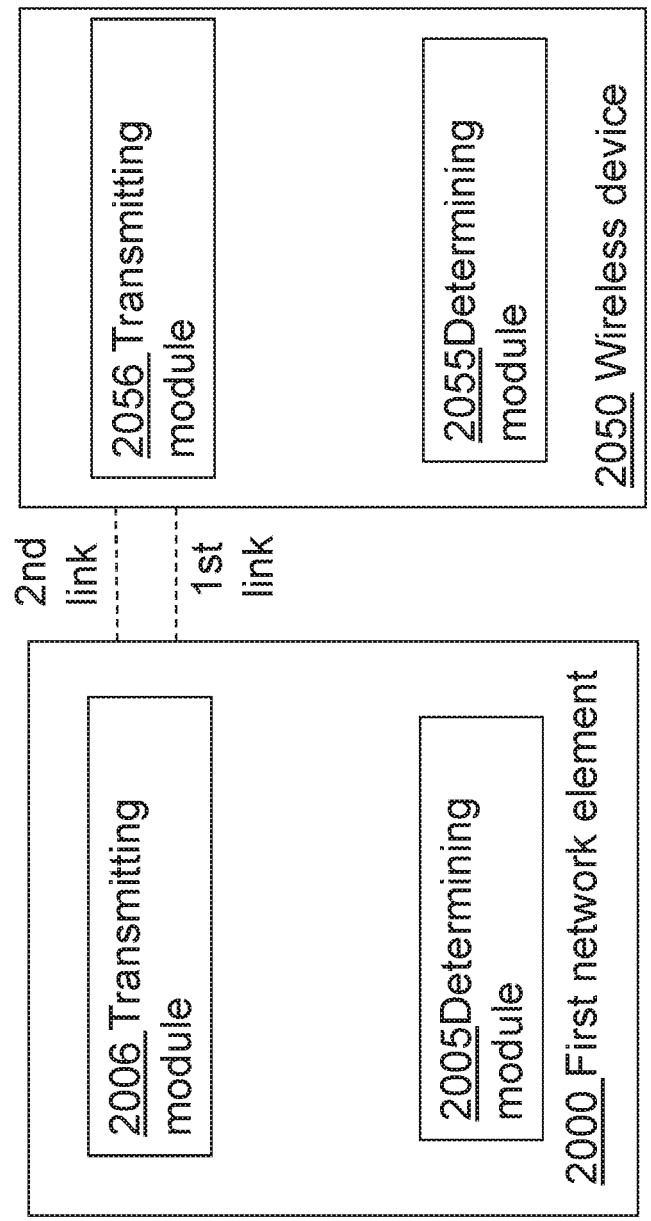

In an alternative way to describe the embodiment in FIG. 20*a* shown in FIG. 20*c*, the wireless device 2050 may comprise a determining module 2055 adapted to determine a transmission mode among alternative transmission modes for transmitting the uplink signaling message. The alternative transmission modes comprise: transmitting on the first wireless link; transmitting on the second wireless link; and transmitting on both the first and the second wireless links. The wireless device 2050 may also comprise a transmitting module 2056 adapted to transmit the uplink signaling message according to the determined transmission mode.

In embodiments, the wireless device 2050 may also comprise a receiving module adapted to receive information from the first network element 2000, indicating at least one of the alternative transmission modes. The determining module 2055 may be adapted to determine the transmission mode based on the received information. In a further embodiment, the determining module 2055 may be adapted to determine the transmission mode based on criteria for determining transmission mode. As another option, the receiving module may be adapted to receive the criteria for determining transmission mode from the first network element 2000.

In other embodiments, the determining module 2055 may be adapted to determine the transmission mode by obtaining the channel quality of at least one of the first and the second wireless links, and by determining the transmission mode based on the obtained channel quality. The obtaining may comprise at least one of measuring the channel quality and receiving the channel quality from the first network element 2000. In embodiments, the wireless device 2050 may comprise an obtaining module adapted to obtain the channel quality of both the first and the second wireless links, and the determining module 2055 may be adapted to determine the transmission mode based on the obtained channel quality by determining to transmit the uplink signaling message on the wireless link with highest obtained channel quality, when the highest obtained channel quality is equal to or above a threshold value. When the highest obtained channel quality is below the threshold value, the determining module 2055 may be adapted to determine the transmission mode based on the obtained channel quality by determining to transmit the uplink signaling message on both the first and the second wireless links.

In embodiments, the determining module 2055 may be adapted to determine the transmission mode by determining to transmit the uplink signaling message on both the first and the second wireless links, and by determining to repeatedly retransmit the uplink signaling message on both wireless links until an acknowledgement of the uplink signaling message is received on at least one of the first and the second wireless links.

As an alternative, the determining module 2055 may be adapted to determine the transmission mode by determining to transmit the uplink signaling message on the first wireless link, and by determining to retransmit the uplink signaling message on the second wireless link if no acknowledgement is received for the uplink signaling message transmitted on the first wireless link.

In any of the embodiments above, the uplink signaling message may be a measurement report. Furthermore, the first and the second wireless links may be both associated with one RAT, or each associated with respective different RATs.

The modules described above are functional units which may be implemented in hardware, software, firmware or any combination thereof. In one embodiment, the modules are implemented as a computer program running on a processor.

In still another alternative way to describe the embodiment in FIG. 20*a*, the wireless device 2050 may comprise a Central Processing Unit (CPU) which may be a single unit or a plurality of units. Furthermore, the wireless device 2050 may comprise at least one computer program product (CPP) with a computer readable medium in the form of a non-volatile memory, e.g. an EEPROM (Electrically Erasable Programmable Read-Only Memory), a flash memory or a disk drive. The CPP may comprise a computer program stored on the computer readable medium, which comprises code means which when run on the CPU of the wireless device 2050 causes the wireless device 2050 to perform the methods described earlier in conjunction with FIGS. 18*a* through 18*e*. In other words, when said code means are run on the CPU, they correspond to the processing circuit 2051 of the wireless device 2050 in FIG. 20*a*.

Network Element

An embodiment of a first network element 2000 is schematically illustrated in the block diagram in FIG. 20*a*. The first network element 2000 is configured to enable the wireless device 2050 to transmit an uplink signaling message in a wireless communication network. The first network element 2000 may in embodiments be comprised in an eNodeB of an LTE network. The wireless device 2050 is connectable to the first network element 2000 over at least a first and a second wireless link. The first network element 2000 is further configured to determine at least one transmission mode among alternative transmission modes for transmitting the uplink signaling message. The alternative transmission modes comprise: transmitting on the first wireless link; transmitting on the second wireless link; and transmitting on both the first and the second wireless links. The determining is based on criteria for determining transmission mode. The first network element 2000 is also configured to transmit information to the wireless device 2050 enabling the wireless device 2050 to determine transmission mode for transmitting the uplink signaling message. The information comprise an indication of the determined at least one transmission mode.

The first network element 2000 may in embodiments be configured to transmit information to the wireless device 2050 further comprising criteria for determining transmission mode.

Furthermore, the first network element 2000 may in embodiments be configured to receive the uplink signaling message from the wireless device 2050 in accordance with one of the alternative transmission modes.

In any of the embodiments above, the uplink signaling message may be a measurement report. Furthermore, the first and the second wireless links may be both associated with one RAT, or each associated with respective different RATs.

The functionality split described e.g. with reference to FIG. 13 above may also be applied in embodiments. In such an embodiment, network functions serving the wireless device over the first wireless link are split between the first network element and a second network element. Network functions serving the wireless device over the second wireless link are split between the first network element and a third network element. In the example scenario in FIGS. 15 and 16 the first network element correspond to the eNB-a, the second network element corresponds to eNB-s1, and the third network element corresponds to eNB-s2. As described above, the network functions of the first network element may be asynchronous network functions, and the network functions of the second and third network elements may be synchronous network functions. The synchronous network functions of the second network element may have requirements on processing timing which are strictly dependent on timing of the first wireless link. The synchronous network functions of the third network element may have requirements on processing timing which are strictly dependent on timing of the second wireless link. Furthermore, the asynchronous network functions may have requirements on processing timing not strictly dependent on the timing of any of the first or second wireless links.

As illustrated in FIG. 20*a*, the first network element 2000 may comprise a processing circuit 2001 and a memory 2002 in embodiments of the invention. The first network element 2000 may also comprise a communication interface circuit 2003 configured to communicate with the wireless device 2050 over the first and second wireless links. The communication interface circuit 2003 may in embodiments comprise a transceiver adapted to communicate wirelessly with the wireless device 2050. The memory 2002 may contain instructions executable by said processing circuit 2001, whereby the first network element 2000 may be operative to determine at least one transmission mode among alternative transmission modes for transmitting the uplink signaling message. The alternative transmission modes comprise: transmitting on the first wireless link; transmitting on the second wireless link; and transmitting on both the first and the second wireless links. The determining is based on criteria for determining transmission mode.

The first network element 2000 may also be operative to transmit information to the wireless device 2050 enabling the wireless device 2050 to determine transmission mode for transmitting the uplink signaling message. The information comprises an indication of the determined at least one transmission mode.

In an alternative way to describe the first network element, illustrated in FIG. 20*c*, the first network element 2000 may comprise a determining module 2005 adapted to determine at least one transmission mode among alternative transmission modes for transmitting the uplink signaling message. The alternative transmission modes comprise: transmitting on the first wireless link; transmitting on the second wireless link; and transmitting on both the first and the second wireless links. The determining is based on criteria for determining transmission mode. The first network element 2000 may also comprise a transmitting module 2006 adapted to transmit information to the wireless device 2050 enabling the wireless device 2050 to determine transmission mode for transmitting the uplink signaling message. The information comprise an indication of the determined at least one transmission mode.

In embodiments, the transmitting module 2006 may be adapted to transmit information to the wireless device 2050 further comprising criteria for determining transmission mode. In any of the embodiments, the uplink signaling message may be a measurement report. Furthermore, the first and the second wireless links may be both associated with one RAT, or each associated with respective different RATs.

The modules described above are functional units which may be implemented in hardware, software, firmware or any combination thereof. In one embodiment, the modules are implemented as a computer program running on a processor.

In still another alternative way to describe the embodiment in FIG. 20*a*, the first network element 2000 may comprise a Central Processing Unit (CPU) which may be a single unit or a plurality of units. Furthermore, the first network element 2000 may comprise at least one computer program product (CPP) with a computer readable medium in the form of a non-volatile memory, e.g. an EEPROM (Electrically Erasable Programmable Read-Only Memory), a flash memory or a disk drive. The CPP may comprise a computer program stored on the computer readable medium, which comprises code means which when run on the CPU of the first network element 2000 causes the first network element 2000 to perform the method described earlier in conjunction with FIG. 19. In other words, when said code means are run on the CPU, they correspond to the processing circuit 2001 of the first network element 2000 in FIG. 20*a*.

The above mentioned and described embodiments are only given as non-limiting examples. Other solutions, uses, objectives, and functions within the scope of the accompanying patent claims may be possible.

The invention claimed is:

1. A method for transmitting an uplink measurement report message in a wireless dual connectivity communication network, the method being performed in a wireless device connected to the network over at least a first and a second wireless link, the method comprising:
   receiving information for transmitting the uplink measurement report message from the network, indicating at least one of alternative transmission modes, the alternative transmission modes comprising: transmitting on the first wireless link; transmitting on the second wireless link; and transmitting on both the first and the second wireless links;
   determining a transmission mode based on the received information and based on a type of measurement report; and
   transmitting the uplink measurement report message according to the determined transmission mode.

2. The method according to claim 1, wherein the information from the network, indicating at least one of the alternative transmission modes is received via a radio resource control, RRC, message.

3. The method according to claim 1, wherein the determining is further based on criteria for determining transmission mode.

4. The method according to claim 3, further comprising:
   receiving the criteria for determining transmission mode from the network.

5. The method according to claim 3, wherein the criteria for determining transmission mode is related to at least one of:
   a channel quality of at least one of the first and the second wireless links;
   a load on at least one of the first and the second wireless links;
   a wireless device capability of using at least one of the first and the second wireless links;
   a quality of service of a bearer associated with the uplink measurement report message;
   a latency of at least one of the first and the second wireless links;
   a transmission mode of a downlink signaling message to which the uplink measurement report message is a response;
   whether the uplink measurement report message is acknowledged or not;
   use of carrier aggregation on at least one of the first and the second wireless links;
   a speed of the wireless device;
   a quality of service associated with at least one of the first and the second wireless links;
   a pre-determined rule for determining the transmission mode;
   a random selection of at least one of the first and the second wireless links.

6. A wireless device configured to transmit an uplink measurement report message in a wireless dual connectivity communication network, the wireless device being connectable to the network over at least a first and a second wireless link, the wireless device being further configured to:
   receive information for transmitting the uplink measurement report message from the network, indicating at least one of alternative transmission modes, the alternative transmission modes comprising: transmitting on the first wireless link; transmitting on the second wireless link; and transmitting on both the first and the second wireless links;
   determine a transmission mode based on the received information and based on a type of measurement report; and
   transmit the uplink measurement report message according to the determined transmission mode.

7. The wireless device according to claim 6, wherein the information from the network, indicating at least one of the alternative transmission modes is received via a radio resource control, RRC, message.

8. The wireless device according to claim 6, further configured to determine the transmission mode based on criteria for determining transmission mode.

9. The wireless device according to claim 8, further configured to receive the criteria for determining transmission mode from the network.

10. The wireless device according to claim 8, further configured to determine the transmission mode by being configured to:
    obtain the channel quality of at least one of the first and the second wireless links, wherein the obtaining comprises at least one of measuring the channel quality and receiving the channel quality from the network, and
    determine the transmission mode based on the obtained channel quality.

11. A non-transitory computer readable medium comprising instructions executable by processing circuitry of a wireless device connected to a wireless dual connectivity communication network over at least a first and a second wireless link, whereby the wireless device is operable to:
    receive information for transmitting the uplink measurement report message from the network, indicating at least one of alternative transmission modes, the alternative transmission modes comprising: transmitting on the first wireless link; transmitting on the second wireless link; and transmitting on both the first and the second wireless links;
    determine a transmission mode based on the received information and based on a type of measurement report; and
    transmit the uplink measurement report message according to the determined transmission mode.

* * * * *